United States Patent [19]
Kay

[11] Patent Number: 5,930,704
[45] Date of Patent: Jul. 27, 1999

[54] RECONFIGURABLE SUBSCRIBER TERMINAL FOR A WIRELESS TELECOMMUNICATIONS SYSTEM

[75] Inventor: David L. Kay, London, United Kingdom

[73] Assignee: Airspan Communications Corporation, Feltham, United Kingdom

[21] Appl. No.: 08/657,680

[22] Filed: May 31, 1996

[30] Foreign Application Priority Data

Jun. 2, 1995 [GB] United Kingdom .................... 9510870
Feb. 22, 1996 [GB] United Kingdom .................... 9603785

[51] Int. Cl.[6] ........................................ H04Q 7/20
[52] U.S. Cl. ........................... 455/419; 455/69; 455/557; 455/186.1
[58] Field of Search ..................................... 455/418, 419, 455/420, 463, 464, 68, 69, 556, 557

[56] References Cited

U.S. PATENT DOCUMENTS

| | | | |
|---|---|---|---|
| 4,284,848 | 8/1981 | Frost .................................... | 179/2 EB |
| 5,239,680 | 8/1993 | Grube et al. ............................. | 455/419 |
| 5,400,389 | 3/1995 | Niiyama et al. .......................... | 379/58 |
| 5,414,751 | 5/1995 | Yamada .................................... | 379/58 |
| 5,465,288 | 11/1995 | Falvey et al. .......................... | 455/419 |
| 5,475,735 | 12/1995 | Williams ................................. | 455/432 |
| 5,507,009 | 4/1996 | Grube et al. ............................. | 455/419 |
| 5,604,789 | 2/1997 | Lerman .................................... | 455/454 |
| 5,754,954 | 5/1998 | Cannon et al. ........................... | 455/70 |

FOREIGN PATENT DOCUMENTS

| | | | |
|---|---|---|---|
| 0459344 | 12/1991 | European Pat. Off. ......... | H04Q 7/04 |
| 9107839 | 5/1991 | WIPO ............................. | H04M 11/06 |
| 9217943 | 10/1992 | WIPO . | |

OTHER PUBLICATIONS

International Search Report, dated Oct. 31, 1996, re:PCT/US96/08512, 6 pages.

*Primary Examiner*—Edward F. Urban
*Attorney, Agent, or Firm*—Baker & Botts, L.L.P.

[57] ABSTRACT

A subscriber station for the wireless connection of user telecommunications equipment to a remote central station of a wireless telecommunications system includes a transmitter/receiver for wireless communication with the central station, at least one telephone line for connection to subscriber telecommunications equipment and a communications controller connected between the transmitter/receiver and the telephone line for processing signals for transmission and/or received signals The subscriber station is configurable in response to wireless programming signals representative of control code down-loaded from the central station By enabling the down-loading of software for programming the subscriber station, the flexibility and convenience of configuring the subscriber station, both initially and subsequently, is greatly enhanced

14 Claims, 20 Drawing Sheets

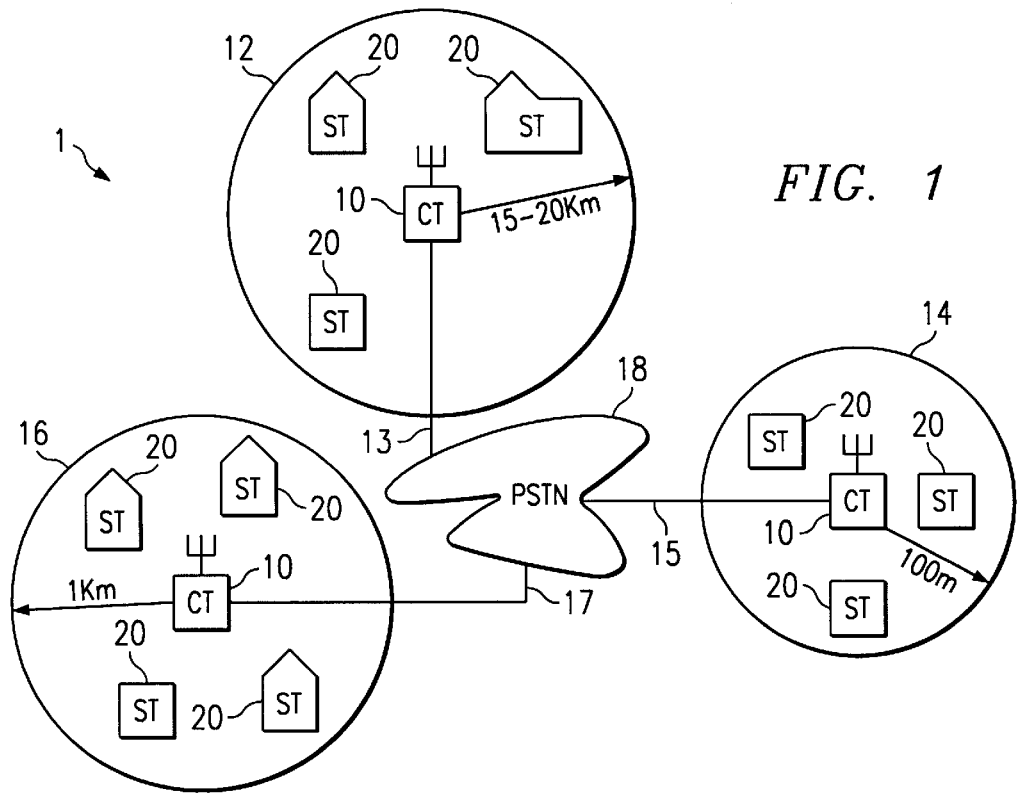
FIG. 1
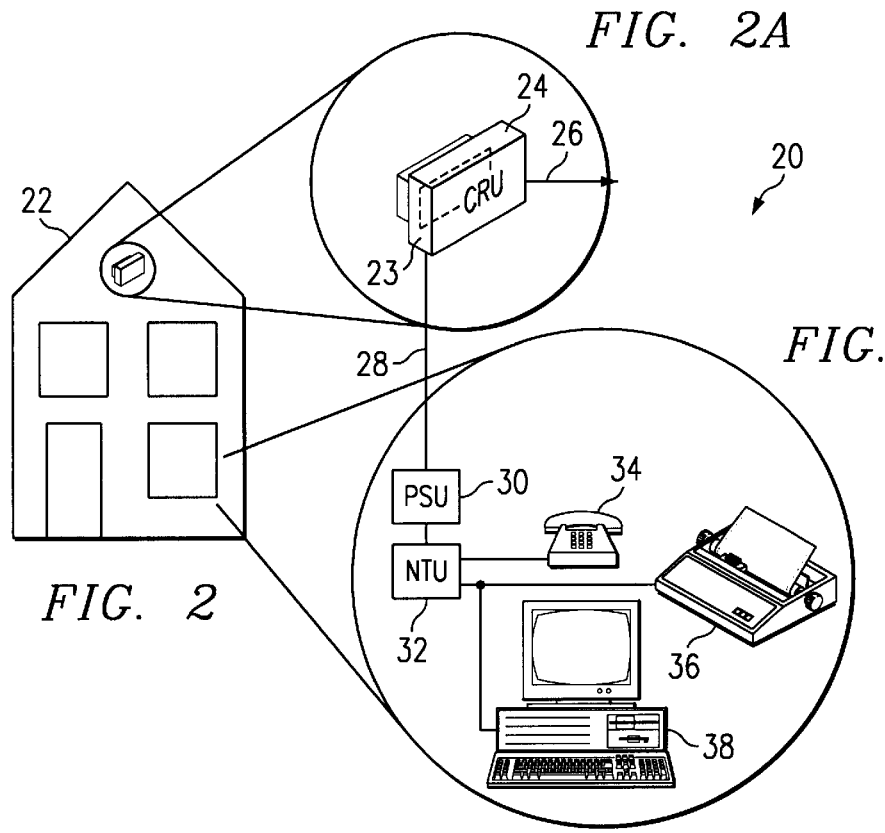
FIG. 2
FIG. 2A
FIG. 2B

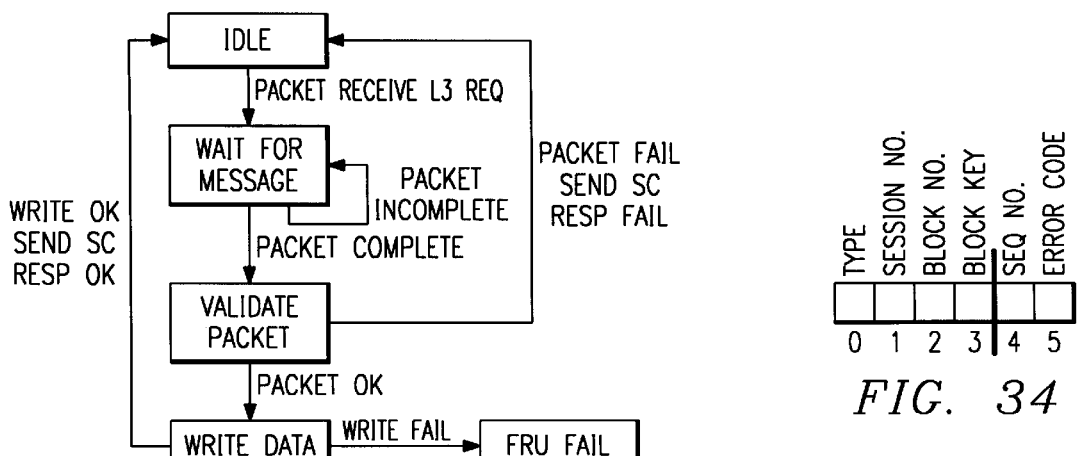
FIG. 32
FIG. 34
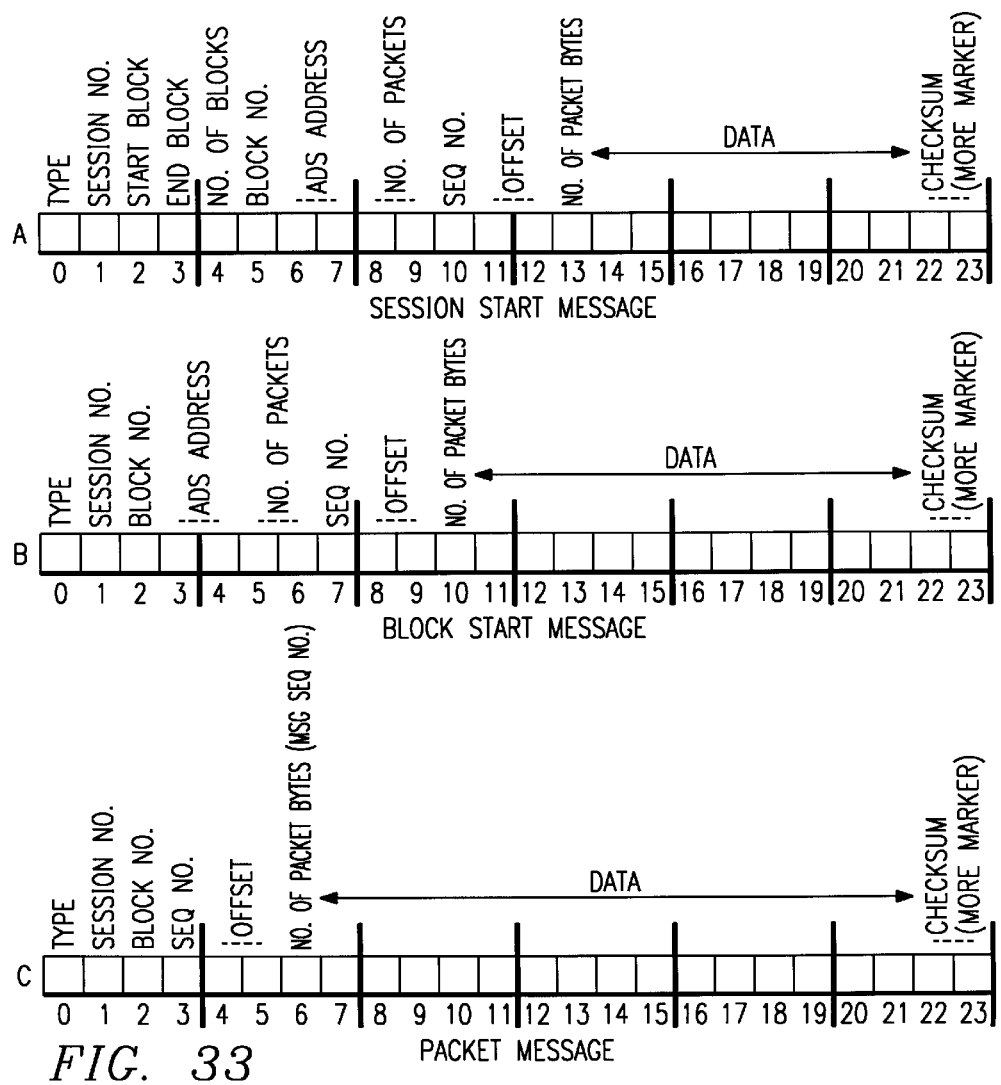
FIG. 33

RECONFIGURABLE SUBSCRIBER TERMINAL FOR A WIRELESS TELECOMMUNICATIONS SYSTEM

TECHNICAL FIELD OF THE INVENTION

The present invention relates in general to telecommunications systems and more particularly to the configuring of a subscriber terminal of a wireless telecommunications system.

BACKGROUND OF THE INVENTION

A wireless telecommunications system has been proposed with a central terminal, or station, at a central location in wireless communication with a plurality of subscriber terminals, or stations, at subscriber locations to implement a wireless telephony system The system is intended to be used with fixed subscriber locations rather than the more familiar mobile cellular telephone systems.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

In the proposed system, the subscriber terminal is required to perform wireless transmission and reception tasks, signal coding and decoding tasks, initialisation and authentication tasks as well conventional telephony tasks. Function for executing these tasks can be set up at the initial installation of the subscriber unit at a customer's location However, it may be desired to update the functions available at the customer's premises after installation. Particularly bearing in mind that the subscriber stations may be widely scattered, it is inconvenient to have to visit each subscriber station in order to provide for re-programming of the subscriber station.

It may be desirable in some instances to ensure that standard installation is effected for all subscriber stations. In other instances, it may be desirable to provide different installations at different subscriber stations. The administration in ensuring that installers have the correct equipment at subscriber stations is significant. Accordingly, it can be seen that the programming and installation of subscriber stations is a potentially costly and inconvenient operation. The invention seeks to address these problems.

SUMMARY OF THE INVENTION

In accordance with the invention, therefore, there is provided a subscriber station for the wireless connection of user telecommunications equipment to a remote central station of a wireless telecommunications system, the subscriber station comprising a transmitter/receiver for wireless communication with the central station, at least one telephone line for connection to subscriber telecommunications equipment and a communications controller connected between the transmitter/receiver and the telephone line for processing signals for transmission and/or received signals, the subscriber station being configurable in response to wireless programming signals representative of control code down-loaded from the central station.

By enabling the down-loading of software for programming the subscriber station, the flexibility and convenience of configuring the subscriber station, both initially and subsequently, is greatly enhanced.

Preferably, the communications controller comprises one or more memories loadable with control code down-loaded from the central station and a processor arranged to execute the control code for configuring the subscriber station.

More preferably, the subscriber station includes two memories for storing control code, wherein the communications controller is arranged to store successive updates of control code received from the central station alternately in the control memories, each update has an associated version number and the processor is arranged to execute the control code having the most recent valid version number. This facilitates successive updates to the programming of the subscriber station and the correct identification of the current version of the software for configuring the subscriber station.

Preferably, the subscriber station includes a reset state machine responding to a reset state to determine which memory contains the control code having the most recent valid version number.

In the preferred embodiment of the invention, each memory is a flash memory and the processor is a microcontroller.

In one embodiment of the invention, the communications controller comprises a digital signal processor and/or a programmable storage unit, the processor configures the digital signal processor and/or the programmable storage unit with the control code.

In the preferred embodiment the transmitter/receiver comprises at least one aerial and is contained with the communications controller in a common housing to be mounted on a structure to permit wireless communication between the subscriber station and the remote central station. A drop cable is provided for connection to a power supply unit and for connection of the user telecommunication equipment.

The invention also provides a wireless telecommunications system comprising at least one the subscriber station as defined above and a central station, the central station being arranged to transmit programming information to the subscriber station for configuring the subscriber station.

In accordance with another aspect of the invention, there is provided a method of programming a subscriber station for wireless connection of telecommunications equipment to a remote central station of a wireless telecommunications system, the method comprising:

transmitting wireless programming signals representative of control code from the central station to the subscriber station, receiving the programming signals at the subscriber station; and configuring the subscriber station in response to the control code represented by the programming signals down-loaded from the central station.

BRIEF DESCRIPTION OF THE DRAWINGS

An embodiment of the invention will be described hereinafter, by way of example only, with reference to the accompanying drawings in which like reference signs are used for like features and in which:

FIG. 1 is a schematic overview of an example of a wireless telecommunications system;

FIG. 2 is a schematic illustration of an example of a subscriber terminal of the telecommunications system of FIG. 1;

FIG. 32 illustrates a layer 2 state machine implemented at the subscriber terminal;

FIG. 33 illustrates three types of messages used for transmitting data; and

FIG. 34 represents a response message.

DETAILED DESCRIPTION OF THE INVENTION

Figure 3:
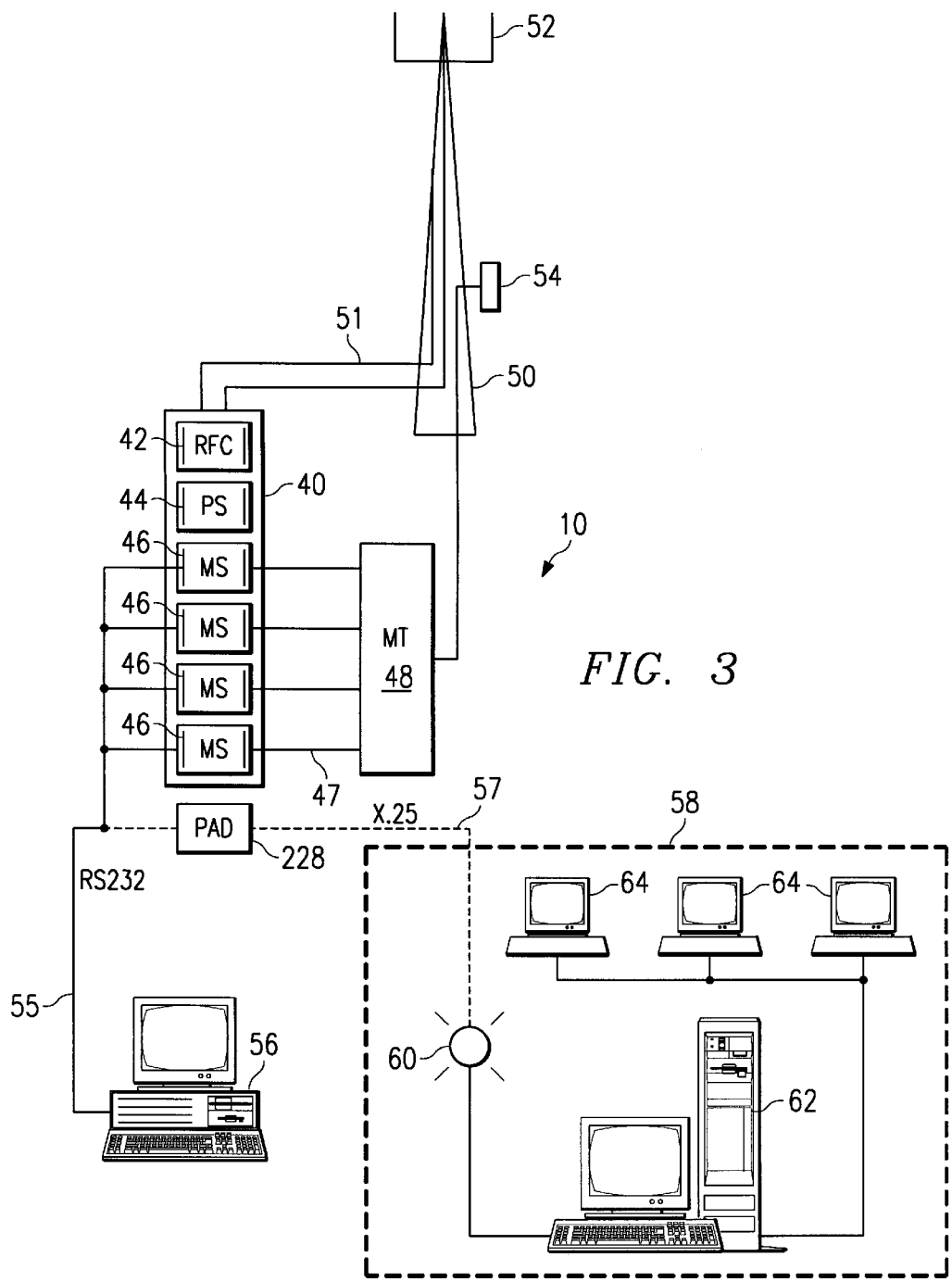
FIG. 3 is a schematic illustration of an example of a central terminal of the telecommunications system of FIG. 1.

FIG. 1 is a schematic overview of an example of a wireless telecommunications system The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
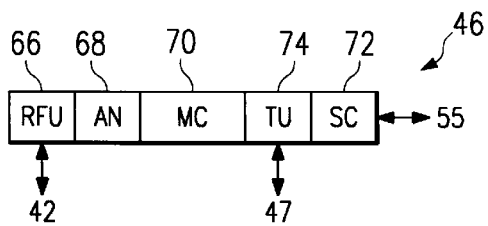
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes 1/2 rate convolution coding and x 16 spreading with CDMA codes on the transmit signals, and synchronisation recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
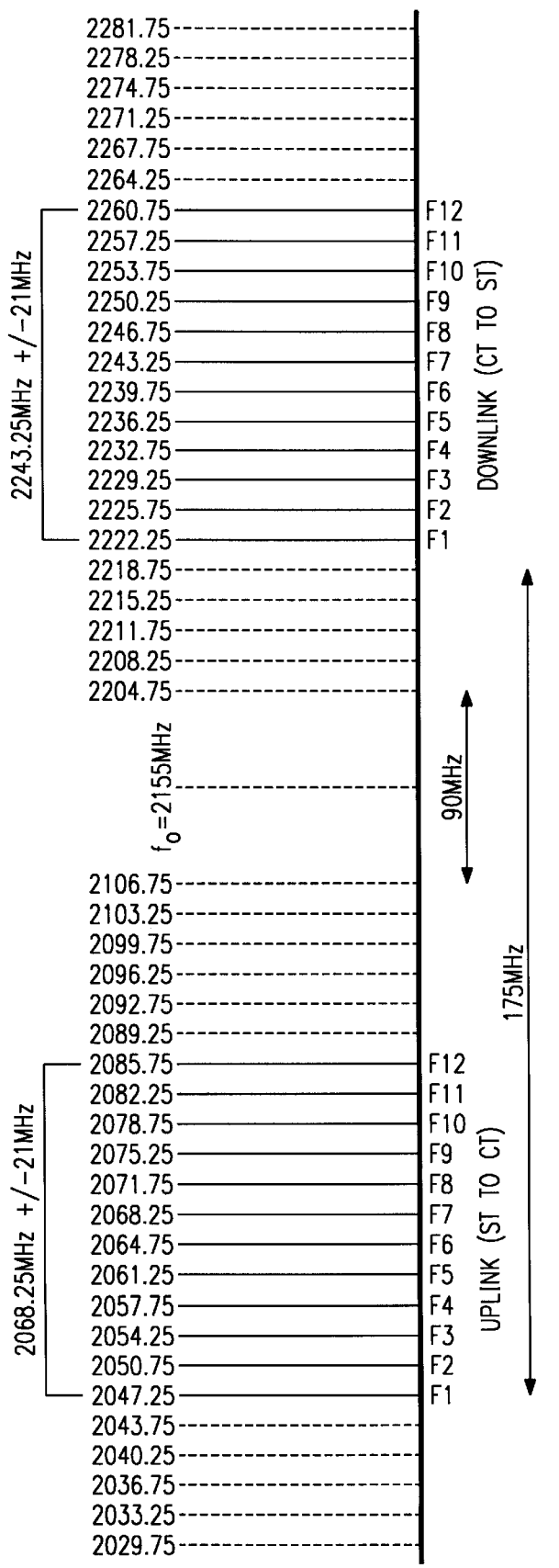
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10

Figure 5A:
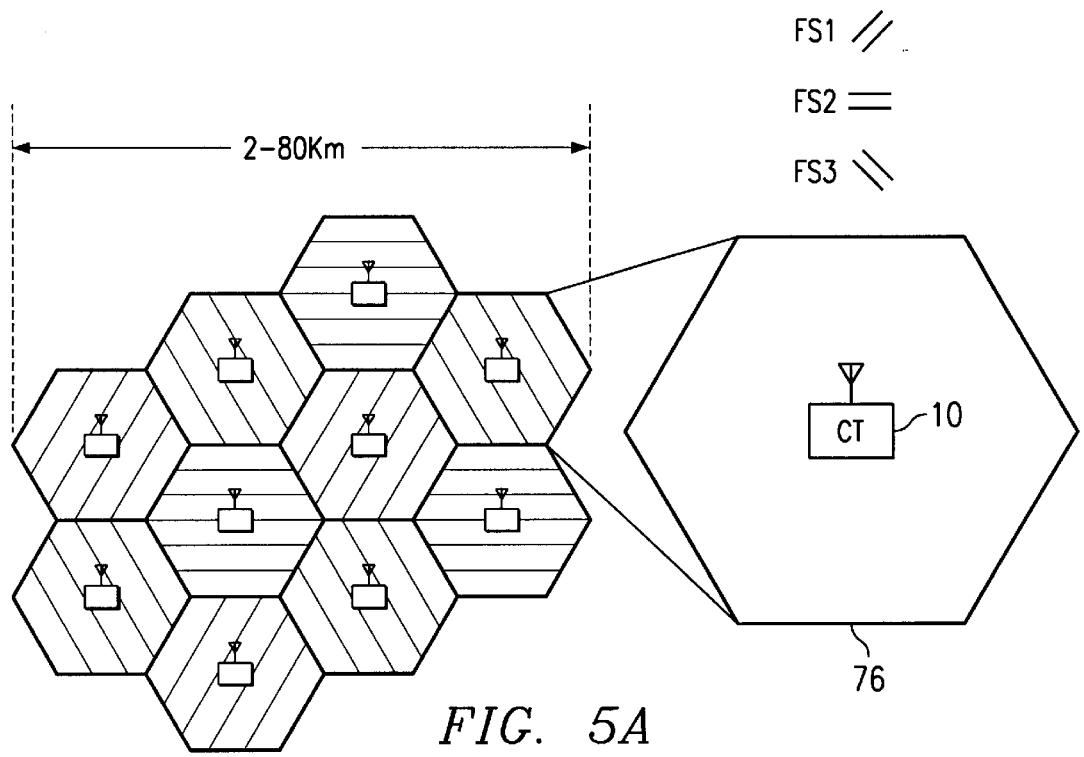
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
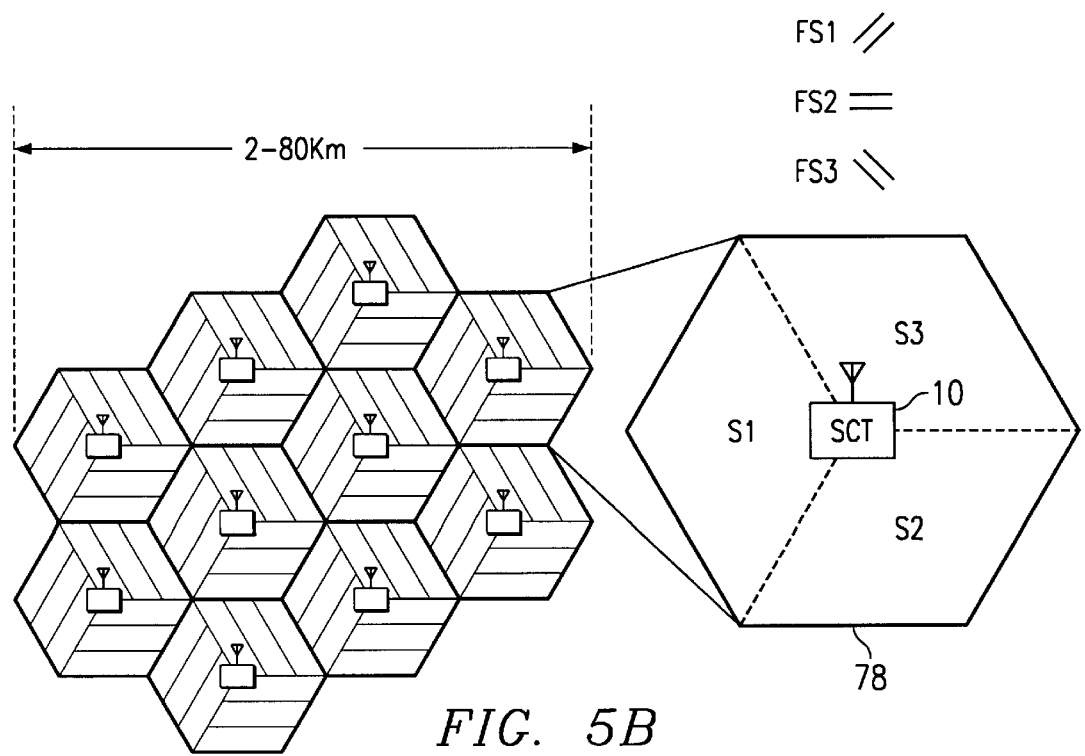

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 60 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
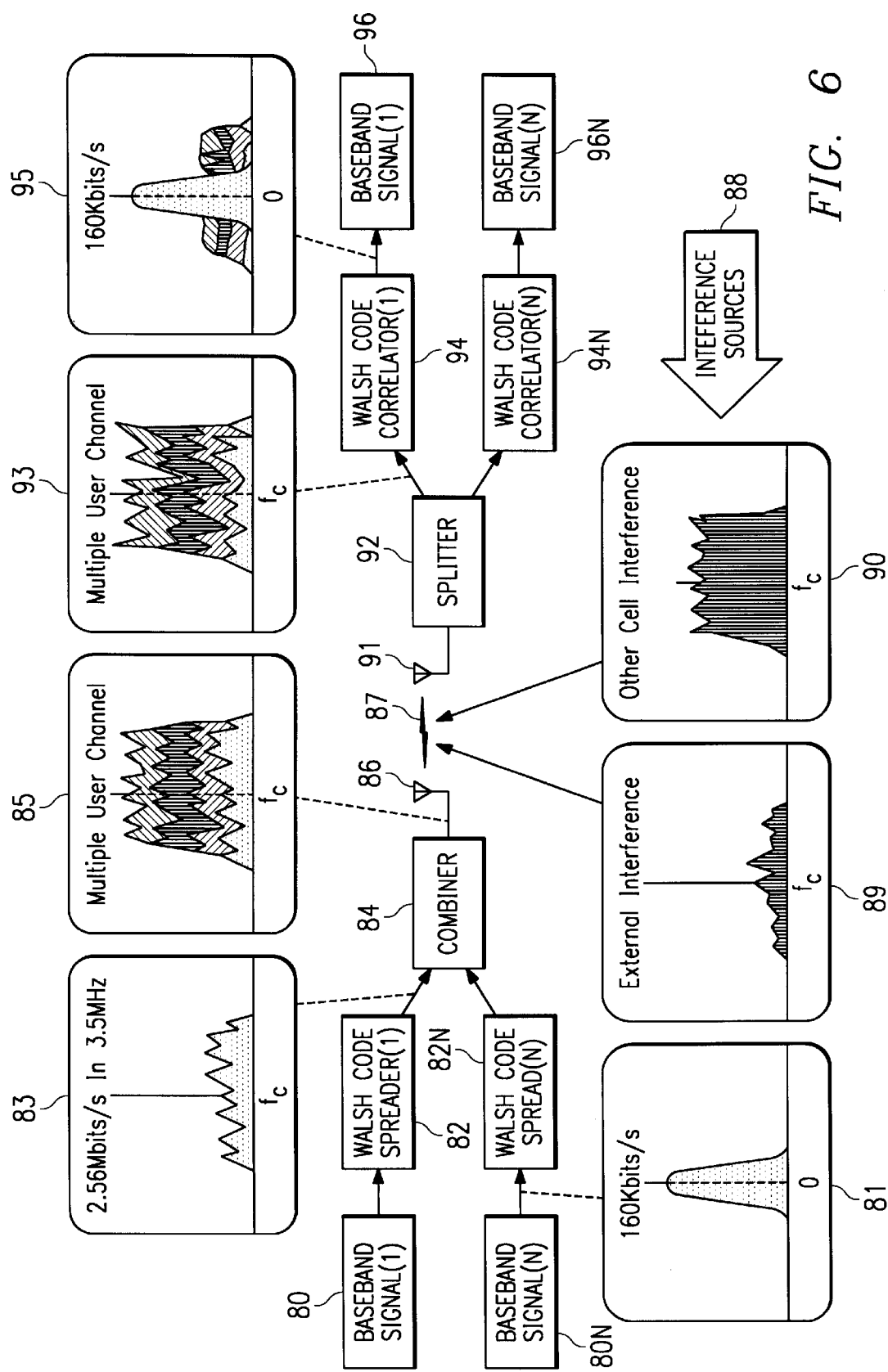
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80—80N into a 160 ksymbols/sec baseband signal where each symbol represents 2 data bits (see, for example the signal represented at 81). This signal is then spread by a factor of 16 using a respective Walsh pseudo random noise (PN) code spreading function 82—82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94—94N uses the same pseudo random noise (PN) code that was used for the encoding for each subscriber link to extract a signal (e.g, as represented at 95) for the respective received baseband signal 96—96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
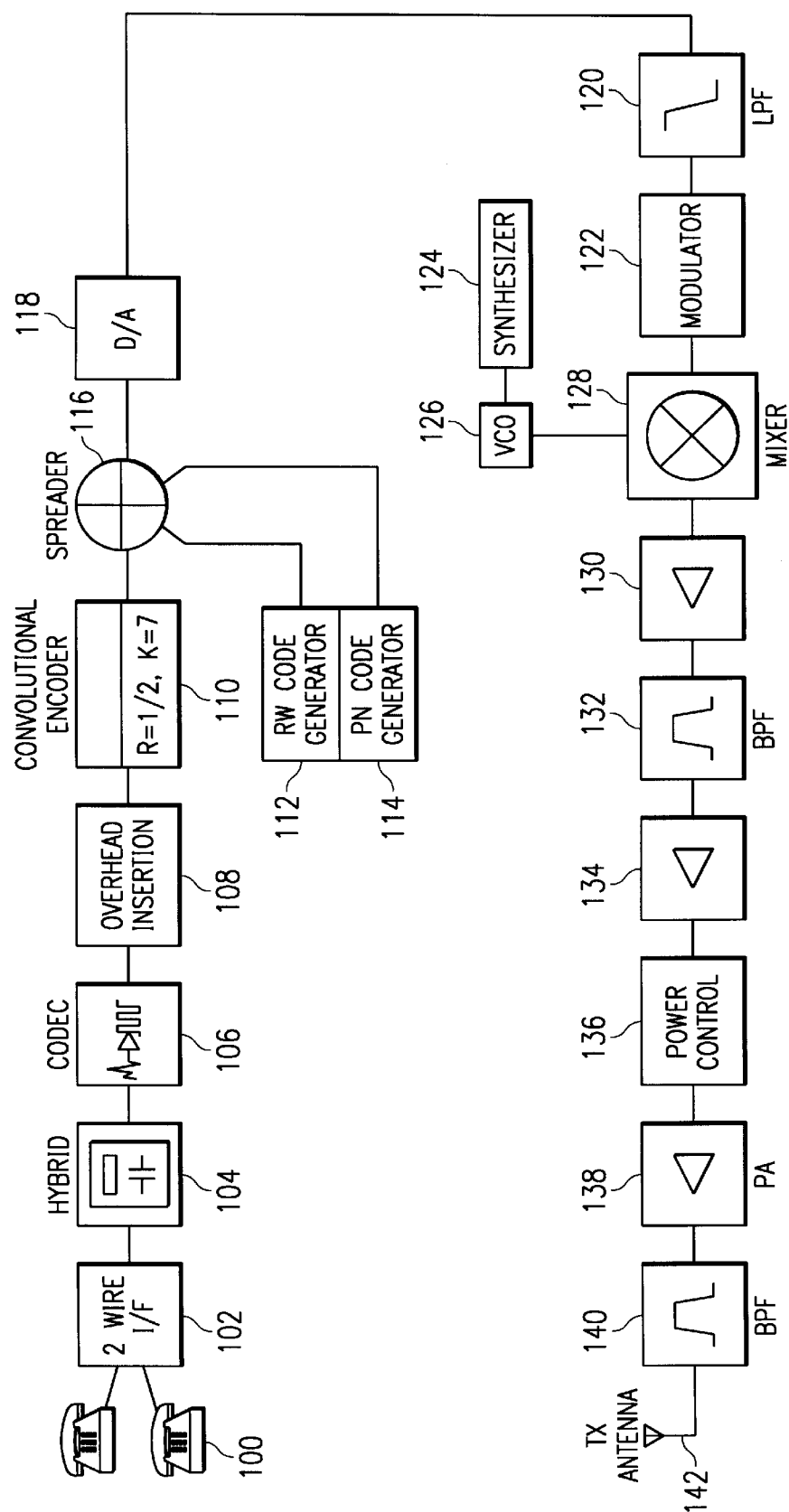
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
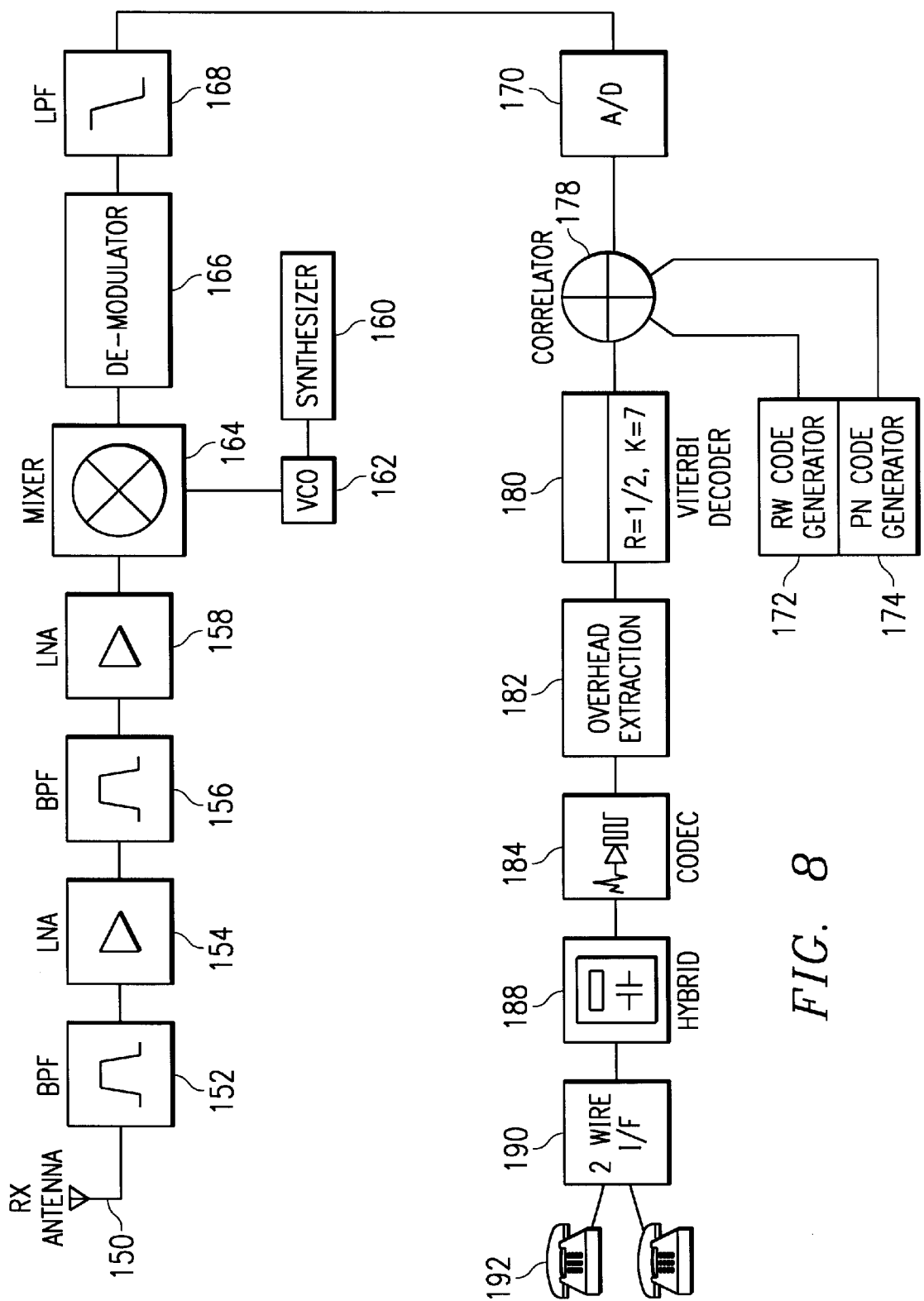
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator to be described later.

Figure 9:
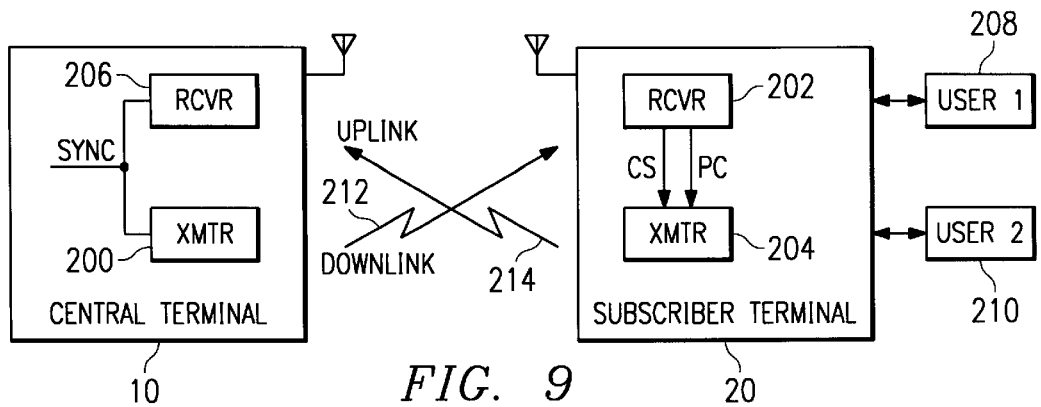
FIG. 9 is a schematic diagram illustrating downlink and uplink communication paths for the wireless telecommunications system.

FIG. 9 is a block diagram of downlink and uplink communication paths between the central terminal 10 and the subscriber terminal 20. A downlink communication path is established from the transmitter 200 in the central terminal 10 to the receiver 202 in the subscriber terminal 20. An uplink communication path is established from the transmitter 204 in the subscriber terminal 20 to the receiver 206 in the central terminal 10. Once the downlink and the uplink communication paths have been established in the wireless telecommunication system 1, telephone communication may occur between a first user 208 or a second user 210 of the subscriber terminal 20 and a user serviced through the central terminal 10 over a downlink signal 212 and an uplink signal 214. The downlink signal 212 is transmitted by the transmitter 200 of the central terminal 10 and received by the receiver 202 of the subscriber terminal 20. The uplink signal 214 is transmitted by the transmitter 204 of the subscriber terminal 20 and received by the receiver 206 of the central terminal 10. The downlink signal 212 and uplink signal 214 are transmitted as CDMA spread spectrum signals.

Figure 10:
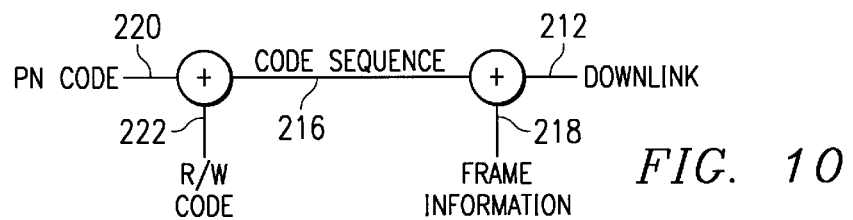
FIG. 10 is a schematic diagram illustrating a downlink signal transmitted by the central terminal.

The receiver 206 and the transmitter 200 within the central terminal 10 are synchronized to each other with respect to time and phase, and aligned as to information boundaries. In order to establish the downlink communication path, the receiver 202 in the subscriber terminal 20 should be synchronized to the transmitter 200 in the central terminal 10. Synchronization occurs by performing an acquisition mode function and a tracking mode function on the downlink signal 212. Initially, the transmitter 200 of the central terminal 10 transmits the downlink signal 212. FIG. 10 shows the contents of the downlink signal 212. The downlink signal 212 includes a code sequence signal 216 for the central terminal 10 combined with a frame information signal 218. The code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operate off of the same pseudo-random noise code signal as the central terminal 10. Each modem shelf 46 in the central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as the downlink signal 212 transmitted by the central terminal 10 and destined for the specific subscriber terminal 20.

The downlink signal 212 is received at the receiver 202 of the subscriber terminal 20. The receiver 202 compares its phase and code sequence to a phase and code sequence within the code sequence signal 216 of the downlink signal 212. The central terminal 10 is considered to have a master code sequence and subscriber terminal 20 is considered to have a slave code sequence. The receiver 202 incrementally adjusts the phase of its slave code sequence to recognize a match to master code sequence and place the receiver 202 of the subscriber terminal 20 in phase with the transmitter 200 of the central terminal 10. The slave code sequence of the receiver 202 is not initially synchronized to the master code sequence of the transmitter 200 and the central terminal 10 due to the path delay between the central terminal 10 and the subscriber terminal 20. This path delay is caused by the geographical separation between the subscriber terminal 20 and the central terminal 10 and other environmental and technical factors affecting wireless transmission.

When the downlink and the uplink communication paths are acquired, the wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between the central terminal 10 and the subscriber terminal 20 over the overhead channel 224.

When either an incoming or outgoing call is detected, a message is sent from the originating terminal to the destination terminal indicating that the downlink and uplink communication paths are required for the transmission of user traffic information. At this point, the wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals Upon detection of call termination, a message is sent from the terminating terminal to the other terminal indicating that the downlink and uplink communication paths are no longer required. At this point, wireless telecommunication system 1 reenters the standby mode. Code synchronisation and frame alignment tracking is performed in both the standby mode and the traffic mode.

Figure 11:
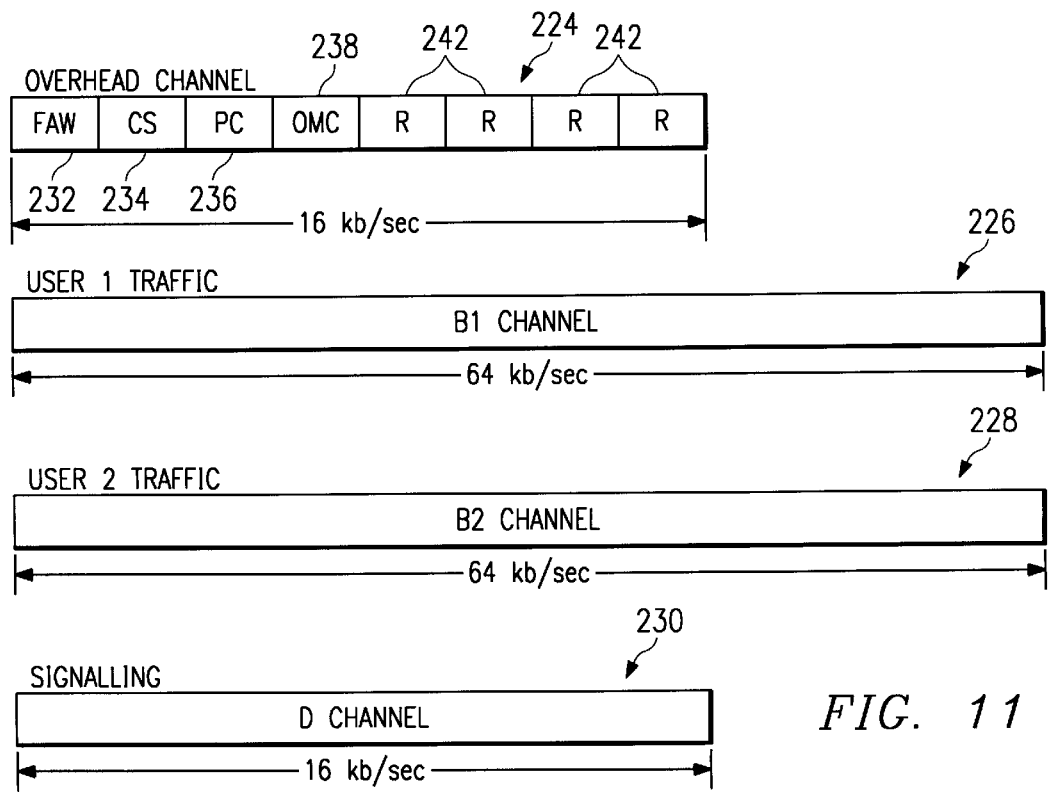
FIG. 11 is a graphical diagram illustrating the contents of a frame information signal within the downlink signal.

FIG. 11 shows the general contents of a frame information signal 218. The frame information signal 218 includes an overhead channel 224, a first user channel 226, a second user channel 228, and a signalling channel 230 for each frame of information transported over downlink signal 212. The overhead channel 224 carries control information used to establish and maintain the downlink and uplink communication paths. The first user channel 226 is used to transfer traffic information to the first user 208. The second user channel 228 is used to transfer traffic information to the second user 210. The signalling channel 230 provides the signalling information to supervise operation of the subscriber terminal 20 telephony functions. The overhead channel 224 occupies 16 kilobits per second of a frame of information, the first user channel 226 occupies 64 kilobits per second of a frame of information, the second user channel 228 occupies 64 kilobits per second of a frame of information, and the signalling channel 230 occupies 16 kilobits per second of a frame of information.

Figure 12:
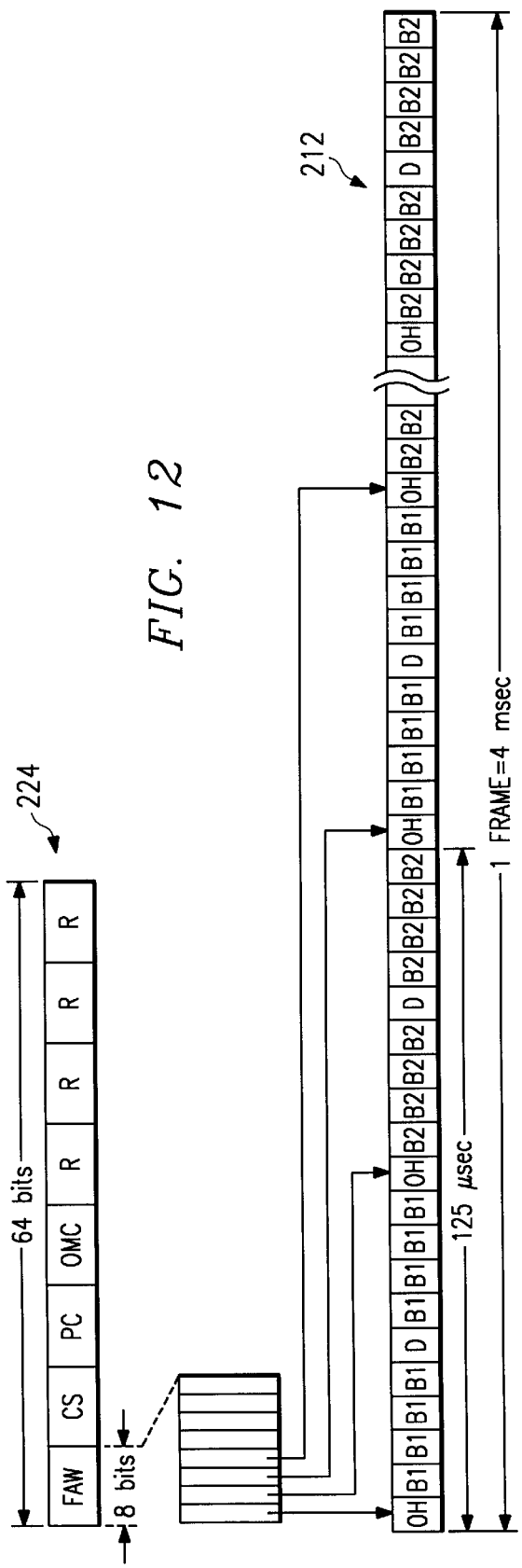
FIG. 12 is a tabular depiction illustrating overhead insertion into a data stream of the downlink signal.

FIG. 12 shows how the overhead channel 224 is inserted into the data stream of the downlink signal 212. The data stream of the downlink signal 212 is partitioned into twenty bit subframes. Each twenty bit subframe has two ten bit sections. A first ten bit section includes an overhead bit, a signalling bit, and eight first user bits. A second ten bit section includes an overhead bit, a signalling bit, and eight second user bits. This twenty bit subframe format is repeated throughout an entire four millisecond frame of information. Thus, an overhead bit occupies every tenth bit position of frame information in the data stream of the downlink signal 212.

The overhead channel 224 includes eight byte fields—a frame alignment word 232, a code synchronization signal 234, a power control signal 236, an operations and maintenance channel signal 238, and four reserved byte fields 242. The frame alignment word 232 identifies the beginning of frame position for its corresponding frame of information. The code synchronization signal 234 provides information to control synchronization of the transmitter 204 in the subscriber terminal 20 to the receiver 206 in the central terminal 10. The power control signal 236 provides information to control transmitting power of the transmitter 204 in subscriber terminal 20. The operations and maintenance channel signal 238 provides status information with respect to the downlink and uplink communication paths and a path from the central terminal to the subscriber terminal on which the communication protocol which operates on the modem shelf between the shelf controller and the modem cards also extends.

Figure 13:
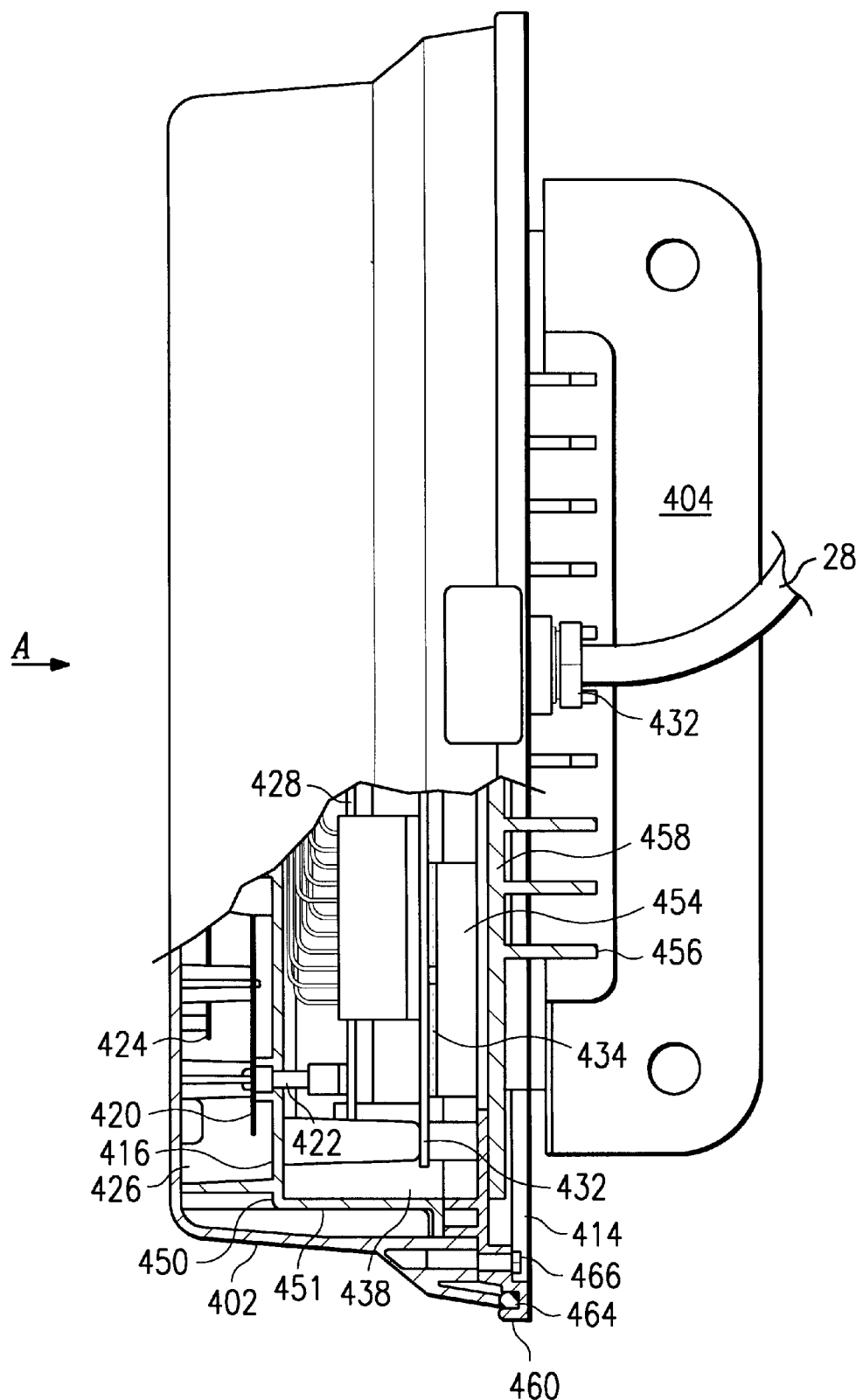
FIG. 13 is a schematic diagram, partially in cross-section of part of a subscriber terminal.

FIG. 13 is a schematic top view, partially in section of an example of an integrated antenna forming the customer radio unit (CRU) of FIG. 1.

FIG. 13 illustrates a chassis member 450 located within a radome 402. A vertically extending wall 416 of the chassis defines a rear wall for first and second resonant cavities 426 defined to the front of the wall 416. Part of one resonant cavity 426, which is located in the right hand portion of the antenna (the lower portion of FIG. 13) when viewed from the front (arrow A) is shown in FIG. 13. The other resonant cavity (not shown) is located in the left hand portion of the antenna (the upper portion of FIG. 13) when viewed from the front (arrow A). A wall (not shown) extends vertically (perpendicularly to the plane of FIG. 13) and forwardly (i.e. to the left in FIG. 13) from the wall 416 to separate the first and second dished resonant cavities 416.

The chassis member is preferably made of the same plastics material as the radome, although other plastics or other materials could be used. The forwardly facing surface of the vertically extending wall 416, the inwardly facing surfaces of the peripheral wall 419 and both sides of the horizontally extending wall 417 are preferably metallised, for example with a deposited layer of aluminium or an aluminium alloy for reflecting radio waves to define the resonant cavities.

Part of the radome 402 is cut away in the lower part of the FIG. to show part of a microstrip radiator element 420 and patch re-radiator (reflector) 424. A stud 422 extends from the microstrip 420 and through the wall 416 to couple radio energy though the wall 416.

The chassis member 450 also has a rearwardly extending peripheral wall 451 for defining a rear cavity 438 for containing electronic components on one or more printed circuit boards. In FIG. 13, an RF board 428 having radio frequency circuitry 430 is provided which, when inserted in cavity 438, cooperates with the stud 422 on the microstrip 420. Also shown is a modem board 432 having modem circuitry for processing received signals from and for providing transmission signals to the RF circuitry 430. The modem circuitry 434 is then connected via a drop cable 28 which passes through a gland 435 in the rear cover 414 to the power supply unit 30 shown in FIG. 2.

The rear side of the wall 416 and the insides of the peripheral wall 451, as well as the inside of the rear cover 414, can be metallised to provide electromagnetic shielding for the electronic components in the rear cavity 438.

In this embodiment, the rear cover 414 has a peripheral portion 460 of plastics material and a central portion 458 formed of aluminium alloy with integral fins 456 to form an integral heat sink. The provision of a heat sink enables heat to be dissipated from electronic components sealed within the integrated antenna units. A bracket 404 is secured to the heatsink by screws 464 although it could be formed integrally with the aluminium portion 458 of the rear cover. An 'O'-ring seal 464 seals the rear cover 460 to the radome when the cover is secured thereto by screws 466. The aluminium portion 458 can be screwed at locations 466 to the peripheral plastics portion and sealed using conventional silicon sealant materials. The inside of the plastics portion 460 of the cover preferably has an aluminium coating to reduce electromagnetic interference.

In an alternative embodiment, the whole of the rear cover could be made of metal, for example, a cast aluminium alloy including the heat sink fins 456 and possibly the bracket 404.

To increase the heat transfer from the electronic components to the heatsink, the heatsink can be provided with internal pedestals 454 for contacting the circuits, or the circuit boards, directly. Alternatively, or in addition, heat conductive foam 452 can be used to couple the heat from the electronic components to the heat sink. This is particularly advantageous where a lot of heat is generated from the electronic components or when the antenna is used in warm environments, in order to avoid overheating of the components within the sealed unit.

Figure 14:
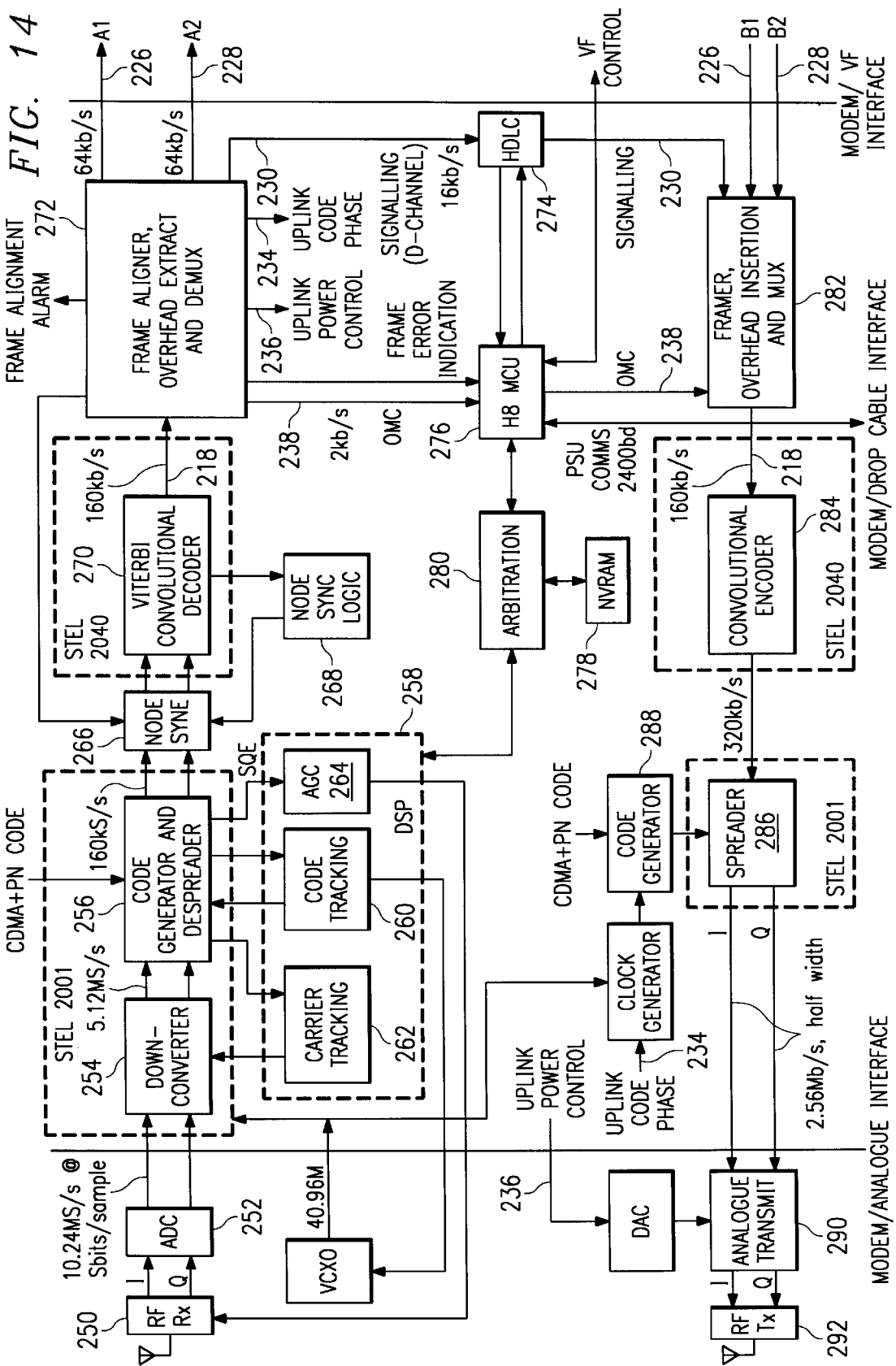
FIG. 14 is a functional block diagram of a communication controller of a subscriber terminal.

FIG. 14 is a detailed block diagram of a communications controller including the receiver 202 and transmitter 204 in a subscriber terminal 20. The receiver 202 receives the downlink signal 212 at an RF receive interface 250. The RF receive interface 250 separates the spread spectrum signal into I and Q signal components. The RF receive interface 250 band pass filters each of the I and Q signal components by removing portions above approximately half of the receiver 202 bandwidth of 3.5 MegaHertz. The RF receive interface 250 low pass filters the I and Q signal components to reject image frequencies and prevent signal aliasing. The I and Q signal components are placed into digital format by an analog to digital converter 252. The sampling frequency of the analog to digital converter 252 is four times the chip period, or 10.24 MegaHertz, with an eight bit resolution.

Within the communications controller, the digital I and Q signal components are stepped to a rate of 5.12 MegaHertz by a down converter 254. A code generator and despreader 256 performs the synchronization acquisition and tracking functions previously described to synchronize the phase of the Rademacher-Walsh and pseudo-random noise code sequence of the receiver 202 to that of the downlink signal 212. A digital signal processor 258 controls the phase of the slave code sequence through a code tracker 260 and a carrier tracker 262. An automatic gain control unit 264 produces an automatic gain control signal to control the gain of RF receive interface 250. The code generator and despreader 256 generates the I and Q 160 kilobits per second of frame information for further synchronization by a node sync interface 266 under the control of a node sync logic unit 268. The node sync interface 266, through the node sync logic unit 268, determines whether the I and Q channels should be swapped, as they may be received in four different ways.

The Viterbi decoder 270 provides forward error correction on the I and Q channels and generates an error corrected 160 kilobits per second data signal after a 71 symbol delay. The error corrected signal is processed by a frame aligner and the extractor 272 determines frame alignment and extracts a power control signal 236, code synchronization 234, and an operations and maintenance channel signal 238. The frame aligner and extractor 272 also extracts a first user channel 226 and a second user channel 228 for traffic transmission towards a first user 208 and a second user 210, and a signalling channel 230 for processing by high level data link controller 274 and a microcontroller 276. The frame aligner and extractor 272 also provides alarm and error indications upon detecting a loss in frame alignment A non-volatile random access memory 278 stores system parameter information for subsequent insertion through an arbitrator 280 in the event of link loss in order to facilitate link reestablishment The arbitrator 280 also provides an interface between the digital signal processor 258 and the microcontroller 276.

In the transmit direction, a frame inserter 282 receives first user traffic and second user traffic from the first user 208 and the second user 210, signalling channel 230 information from the high level data link controller 274, and operations and maintenance channel 238 information from the microcontroller 276. Frame inserter generates the frame information signal 218 for uplink signal 214 for processing by a convolutional encoder 284. The convolutional encoder 284 doubles the data rate of the frame information signal 218 to provide forward error correction. A spreader 286 splits the 320 kilobits per second signal of the convolutional encoder 284 into two 160 kilobits per second I and Q signals and exclusively ORs these signals with the spreading sequence generated by a code generator 288 in response to a system clock generated by the clock generator 290 as adjusted by the code synchronization signal 234. The code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

The spreader 286 of the communications controller supplies the I and Q signals to an analog transmitter 290. The analog transmitter 290 produces pulsed I and Q signals for an RF transmit interface 292. Transmit power is generated by first establishing a control voltage from a digital to analog converter in response to the power control signal 236 extracted from the overhead channel 224. This control voltage is applied to the power control inputs of analog transmitter 290 and RF transmit interface 292. Power control of 35 decibels is obtainable in both the analog transmitter 290 and the RF transmit interface 292. The RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

In the present hardware implementation of the CDMA modem illustrated in FIG. 14 the following major hardware components are used. An ASIC (STEL2001) implements the spread spectrum demodulator and the spreader 286. An FPGA (Field Programmable Gate Array) is used to implement transmit and receive signal formatting and other "glue" logic such as the functions of the code generator and despreader 256 and the code generator 288. The digital signal processor (DSP) 258 controls spread spectrum acquisition and tracking. The H8 microcontroller 276 processes the OMC and signalling channels. It also provides the interface with the power supply unit. A further function of the microcontroller 276 is the programming of the radio frequency synthesizers.

FIGS. 15 to 18 illustrates various aspects of the hardware and operation of the communications controller, that is the modem interface board, for explaining the programming of the devices for configuring the subscriber terminal.

Figure 15:
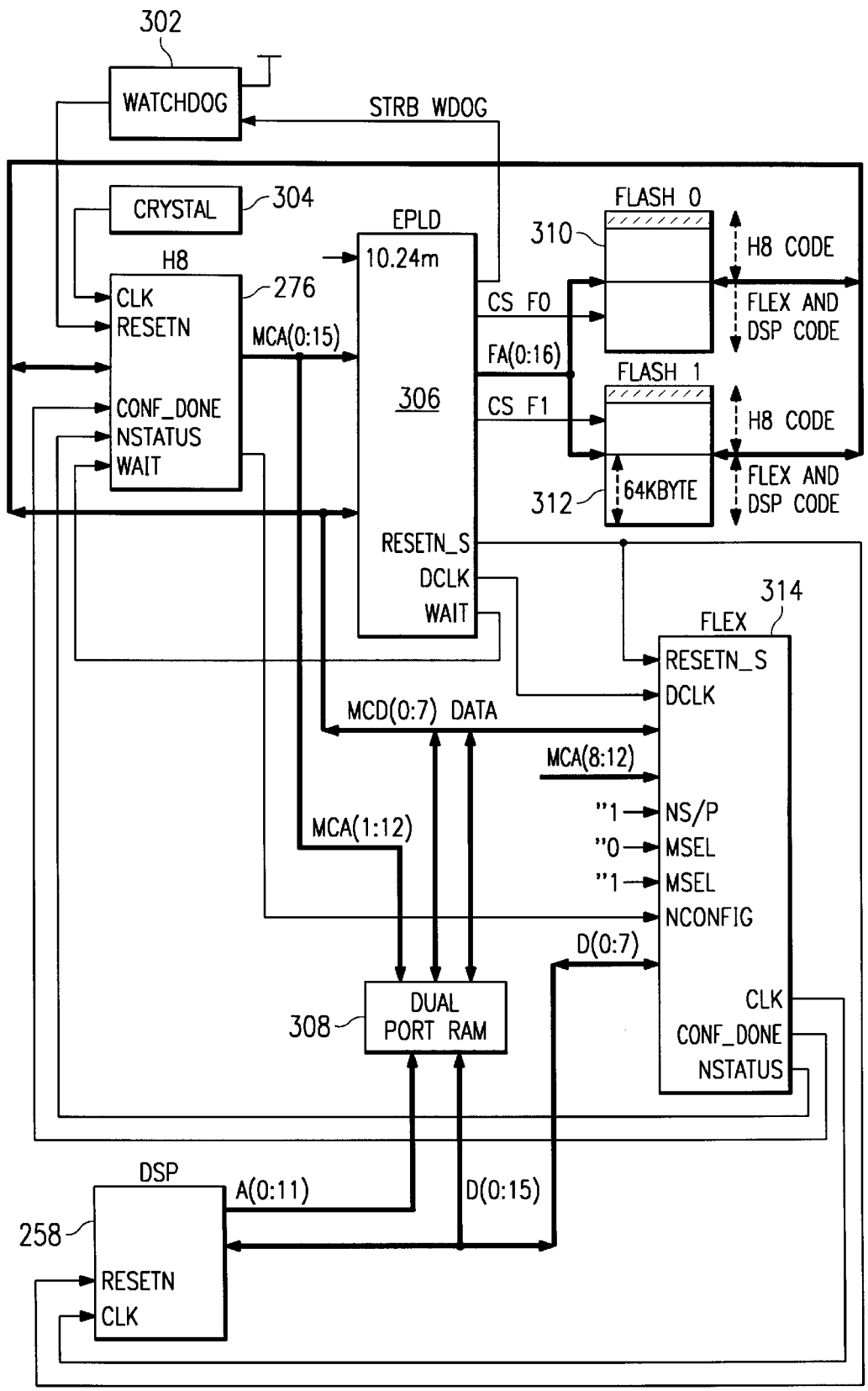
FIG. 15 is a schematic block diagram of hardware elements of the communications controller of FIG. 14.
Figure 16:
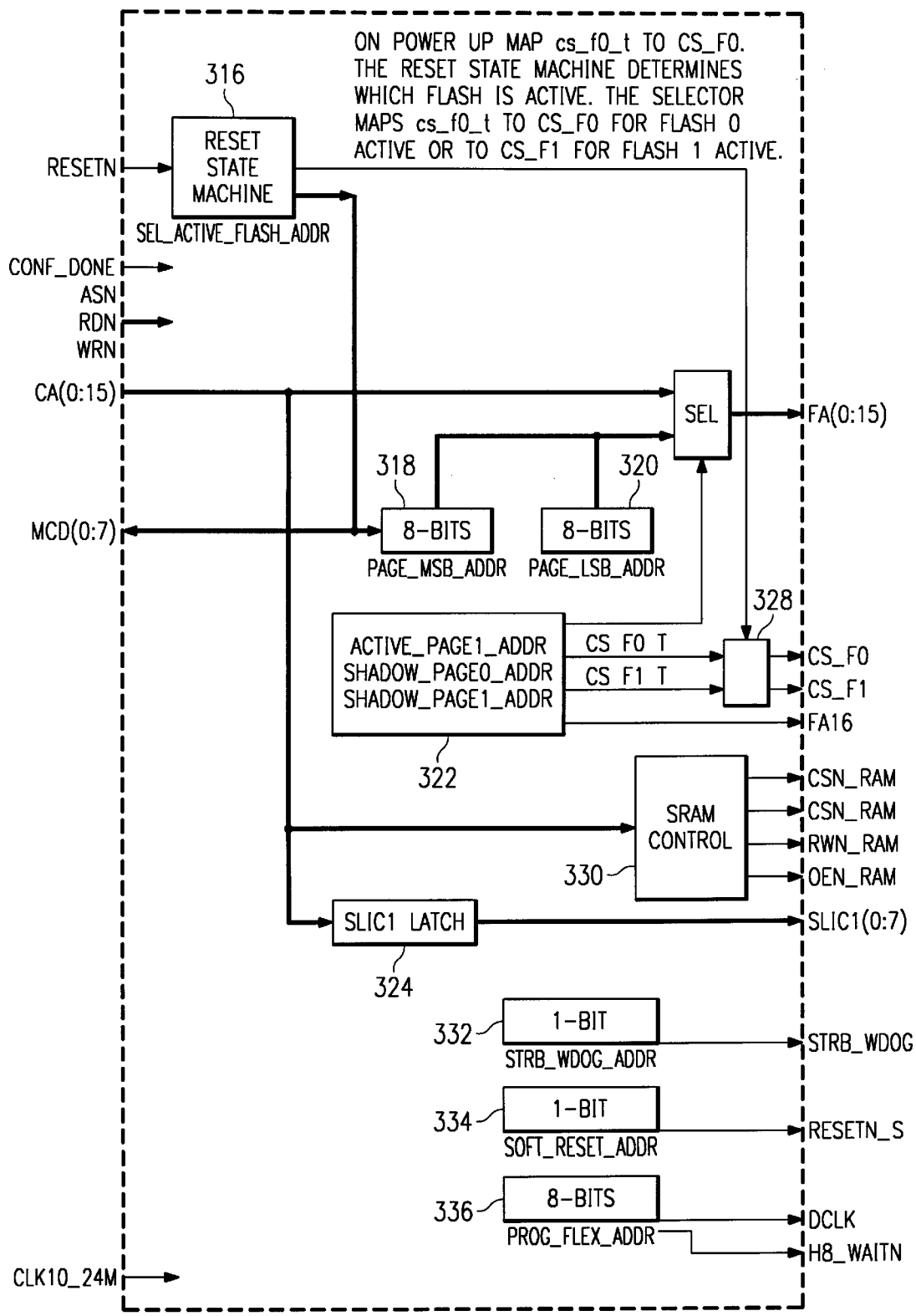
FIG. 16 is a schematic block diagram of other elements of the communications controller of FIG. 14.
Figure 17:
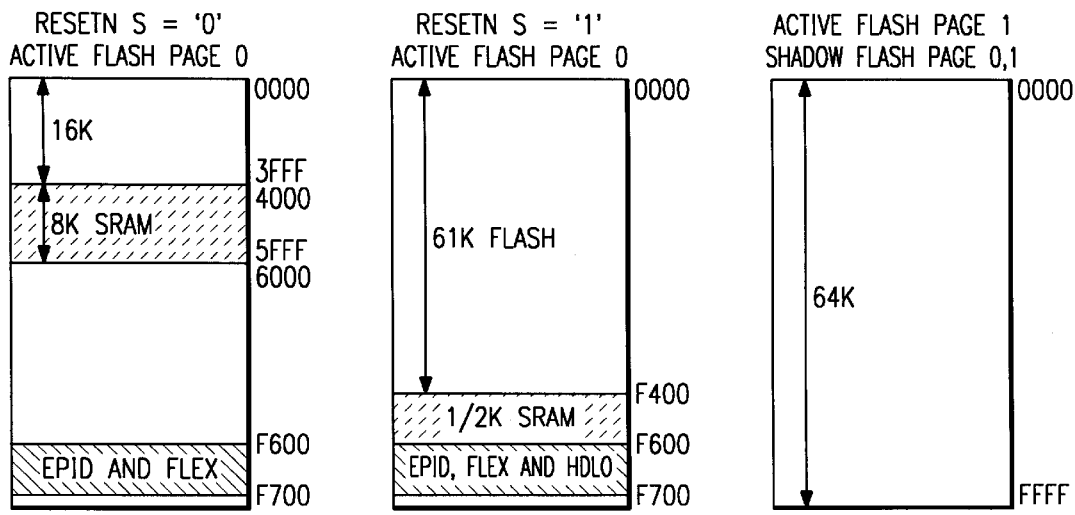
FIG. 17 is a schematic diagram illustrating the mapping of the address space of a microcontroller of the communications controller.

FIG. 15 illustrates the microcontroller 276, a watchdog circuit 302, a crystal 304, an Erasable Programmable Logic Device (EPLD) 306, a dual port RAM 308, first and second flash memories 310 and 312, the FPGA 314 and the Digital Signal Processor (DSP) 258. FIG. 16 illustrates a reset state machine 316, first and second 8 bit registers 318 and 320, an address buffer 322, a selector circuit 326, a gate 328, an SRAM control circuit 330, an SLIC latch 324, two one bit address registers 332 and 334 and an 8 bit address register 336. FIG. 17 illustrates different memory mappings and FIG. 18 illustrates various states of the state machine 316.

At initialisation, for example following a reset, the communications controller, that is the modem interface board, powers up. At this time the microcontroller 278 is caused to configure the FPGA 314, load the dual-port RAM 308 with DSP code and starts the DSP 258 by removing its reset. There are two flash memory chips 310 and 312, one of which holds the active code the other of which holds the code down-loaded from the control terminal.

The reset state machine 316 determines which flash memory 310 or 312 contains the active code. The active code is the code that the microcontroller 276 executes. The other flash memory 312 or 310 holds the shadow code (i.e. code that is down-loaded from the central terminal)

Figure 18:
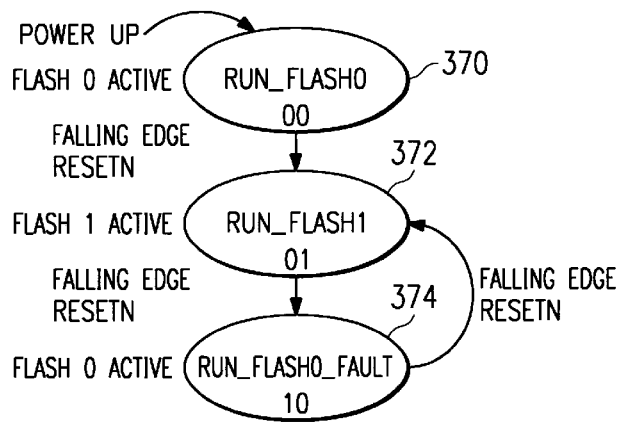
FIG. 18 illustrates various states of a state machine of the communications controller of FIG. 14.

With reference to FIG. 18, on powering up, the microcontroller 276 executes from flash memory 0, 310 state "run_flash0", 370. If, however, the flash memory 1, 312 contains the active code, which is determined by reading the version number of the code stored in the flash memories 310 and 312, then the microcontroller 276 stops strobing the watchdog circuit 302, which forces a reset state and the state machine 316 moves to state "run_flash1", 372. This selects flash memory 1, 312 as the active flash memory. Then, when the reset signal goes high, the code is executed from the flash memory 1, 312.

Figure 19:
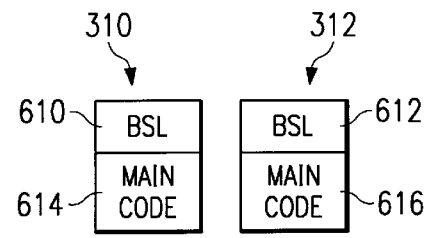
FIG. 19 illustrates a configuration of code within a memory.

Accordingly, the state machine 316 has the effect of restricting power-on boot up to a single flash memory assuming that this is present and operational, regardless of the previous operating scenario. In order to achieve this operation, a small section of the code in the flash memory must remain unchanged to ensure reliability in the event of a down-load failure. FIG. 19 illustrates the manner in which this is achieved. In particular the boot-strap and loader code (BSL) 610 in flash memory 310 is arranged to be constant and never to change, whereas the boot-strap and loader code (BSL) 612 in flash memory 312 can be changed. Both the main code 614 in the flash memory 310 and the main code 616 in the flash memory 312 can be changed, the main code 614 in the flash memory 310 being that which is normally executed first after power-up. Accordingly, the code held in each of the flash memories is structured into a boot-strap and loader code and a separate main code section. These sections will be described later.

The reset state machine 316 is arranged to be able to recover from the following scenarios:

1) Flash memory 0, 310 has been corrupted. When on power up, the flash memory 0, 310 is selected and the code does not execute, a watchdog reset occurs. The state machine 316 then moves on to state "run_flash1" 372 and selects flash memory 1, 312 as the active flash memory.

2) Flash memory 1, 312 has been corrupted but has a higher version number than flash memory 0, 310. When, on power up, code is run from flash memory 0, but is determined that flash memory 1, 312 has a higher version number, flash memory 1 will be checksumed by flash 0 and this will fail, therefore it will not be executed. The state machine 316 then moves to state "run_flash0_fault" 374. The microcontroller software reads the status of the state machine from sel_active_flash_addr (see FIG. 16), and it identifies that there is a fault, ignores the version numbers and continues to run from flash memory 0, 310. Only if the checksum of the failed code is still correct will the above scenario be run through.

Sel_active_flash_addr returns the following values:

| | |
|---|---|
| sel_active_flash_addr = 0 | Flash memory 0 Active |
| sel_active_flash_addr = 1 | Flash memory 1 Active |
| sel_active_flash_addr + 2 | Flash memory 0 Active, | following a warm reboot.

In practice, there is no such state as a fault state since the two code banks can be toggled between indefinitely to down-load new or execute old code.

On power up the RESETN line from the watchdog chip (see FIGS. 15 and 16) goes low, the clock signals to the microcontroller 276 is driven by a 18.432 Mhz crystal 304 and the microcontroller 276 is reset. Flash memory 0, 310 is selected by default and boot code is executed. A series of bytes representing the version number in flash memory 0 and 1 indicate which is the active flash memory, namely the one with the higher version number. If flash memory 0, 310 contains the active code then the microcontroller downloads code to the FPGA and DSP and jumps to the main program.

Any software down-loaded by wireless from the central terminal would be loaded into the shadow flash memory 1, 312 if flash memory 0, 310 is active The boot sections of flash memory 0, 310 is protected so that even if there is a problem during down-load the system can recover. Sectors of the flash memory can be pre-loaded. Indeed this is the case with the boot section of flash memory 0, 310.

A soft reset is performed during loading of the FPGA 314 and DSP 258 using the active code which has been selected, then removed the soft reset to the DSP 258 by writing a '1' to the EPLD 306 store soft_reset_addr. The soft reset output RESETN_S then powers up low.

The programming of the FPGA device 314 by the microcontroller 276 occurs when the microcontroller 276 reads data from the active flash memory 310 or 312. It programs the FPGA device 314 as follows: Initialise nCONFIG=0.
1) Drive nCONFIG low to high to start programming.
2) Wait for nSTATUS to go high.
3) Read Data from the flash memory and write the data to prog_flash memory_addr.
4) The EPLD 306 sets WAIT active and drives DCLK high/low eight times. The data remains stable on the data bus and 8 bits are serialised in the FPGA device 314. The EPLD 306 then sets WAIT inactive.
5) If nSTATUS goes low, there was an error and the process return to step 1 (i.e. reload) otherwise the process goes to step 3.

For the FPGA 81188 24 kbytes are loaded and when programming is complete CONF_DONE goes high.

The microcontroller can only address 64 k of external memory (16 addr lines). Accordingly, on power up it can access 64 k of flash memory 0. To access page 1 of flash memory 0 it needs to do the following:
1) Write the MSB of the address it wants to access to page_msb_addr.
2) Write the LSB of the address it wants to access to page_1sb_addr.
3) Read/write to address active_page1_addr, the EPLD generates the appropriate address and chip selects to access page 1 of flash memory 0.

If it is necessary to access page 0 of flash memory 1, the address is written as in steps 1 and 2 and then read/write to address shadow_page0_addr. To access page 1 of flash memory 1, the address is written as in steps 1 and 2 and then read/write to address shadow_page1_addr.

If the flash memory 1, 310 holds the active code, then the address map needs to be swapped by writing a '1' to sel_active_flash_addr and forcing a microcontroller 276 reset.

The programming of the DSP 258 by the microcontroller 276 occurs on power up with resetn_s low, which is used to reset the DSP 258. This forces the DSP address, data and control signals into a high-impedance state. The microcontroller then writes the DSP program data to the 16-bit×4 K dual-port RAM 308 with even address as the lower 8-bits, odd address as the upper 8-bits The dual-port RAM 308 is mapped into the microcontroller address map as shown in FIG. 17.

It should be noted that before the DSP 258 is reset the microcontroller 276 sees 8 K of RAM and after reset this is mapped into the microcontroller address space. 512 Bytes of RAM are mapped into the microcontroller address space The 512 Bytes of RAM are mapped to A00-AFF of the dual port RAM 308, leaving 3.5 K for the DSP code.

The microcontroller 276 writes the code from the appropriate flash memory into the dual-port RAM 308, reads the RAM to do a checksum and then write '1' to soft_reset_addr. The DSP 258 is reset and executes code from the dual-port RAM 308.

FIGS. 20 to 32 describe various aspects of the communications protocol and aspects of the operation of the software down-load facility of the subscriber terminal of the wireless communications system In the following description, reference will be made to the software down-load for configuring the subscriber terminal, and in particular its communications controller (modem card) of FIG. 14, and to other devices supported thereby. However, an important aspect of the arrangements to be described is that software could be down-loaded for other field replaceable units (FRUs) in the same or a similar manner, thus permitting code re-use.

As mentioned above with reference to FIG. 19, the code in the flash memories 310 and 312 is split into two distinct sections, the boot-strap and loader section and the main code section.

Figure 20:
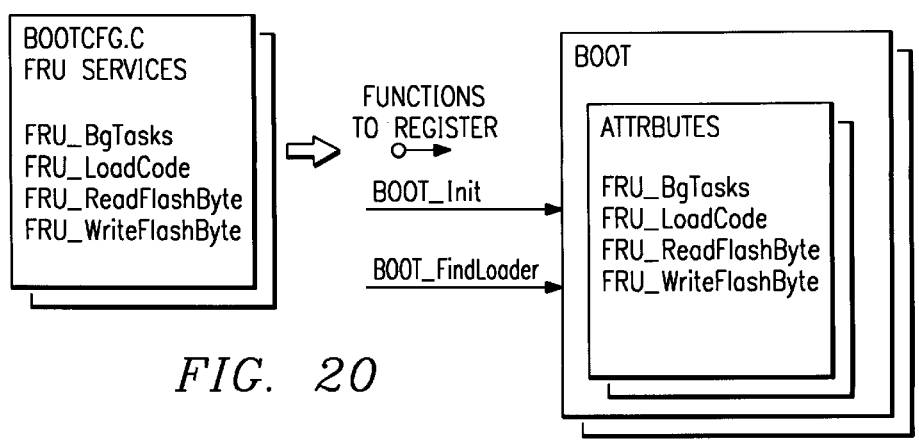
FIG. 20 illustrates an instance of a boot-strap service.

The boot strap and loader code section forms an independent executable segment which resides in the boot areas 610/612 of the flash memories 310/312. This segment initialises the ports of the microcontroller 276 and loads any code stored in the flash memory for any other device supported by the communications controller. The boot-strap is a generic design suitable for all field replaceable units, all service functions which are device specific being externalised. FIG. 20 illustrates an instance of the boot-strap. As represented in FIG. 20, the externalised functions are placed in a separate module and registered with the boot-strap by calling the BOOT_Init service. The externalised services are illustrated in Table 1 below. Note that the services may be empty modules if no processing is required.

TABLE 1

| | |
|---|---|
| void FRU_BootInit (void) | Service to initialise the microcontroller 276 ports and perform any other FRU specific initialisation required |

TABLE 1-continued

| | |
|---|---|
| void FRU_BgTasks (void) | Service to be called periodically by the boot-strap to keep the FRU alive |
| unsigned char FRU_ReadFlashByte (unsigned long Address) | Service to read a byte from the FRU flash memory |
| void FRU_WriteFlashByte (unsigned long Address, unsigned char Data) | Service to write a byte to the FRU flash memory |
| void FRU_LoadCode (void) | Service to load code from the flash memory to other devices on the FRU |

As mentioned above, the software version is checked by the state machine 316. The software version is represented by an 8-bit number, the most significant nibble specifying the major revision number and the least significant nibble specifying the minor revision number Major revisions are interpreted as alpha characters for display purposes at the site management processor 58 or site controller 56 at a central terminal 10 (see FIG. 3). The major revisions typically reflect a change in firmware part number and the minor revisions backwardly compatible upgrades for a particular firmware part number.

A revision of down-loaded code is only executed under command from a central terminal. In order to incorporate the version number, a reset indication for the communications controller of the subscriber terminal includes two bytes to report the current and background version numbers to the central terminal.

Once the externalised services (parameters) have been registered, the BOOT_FindLoader of the boot-strap then performs software version checking. In other words it determine which code should be executed by comparing version numbers and checking a code checksum.

Figure 21:
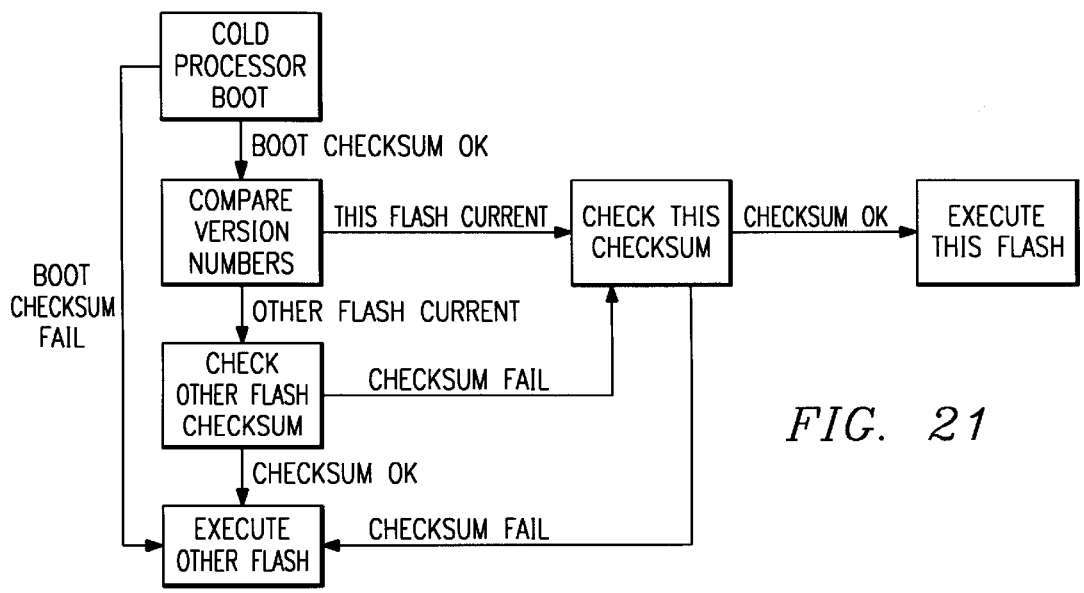
FIGS. 21 and 22 illustrate state machines for cold and warm boot-straps.
Figure 22:
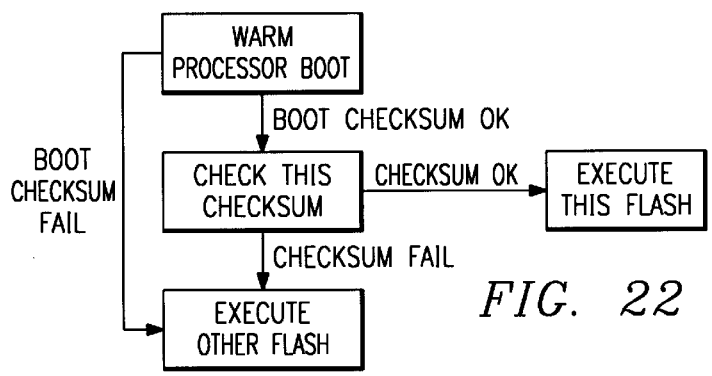

The state machines describing these operations for both a cold and warm start are shown in FIGS. 21 and 22, respectively. If both versions of the code appear to be invalid, the state machines will continuously toggle between the two code banks. It should be noted in the state diagrams forming FIGS. 22 to 30, that the states are indicated in the boxes, and the state transitions are described with the event causing a state transition indicated above the horizontal line and the resulting action indicated below the horizontal line.

The boot-strap is designed to provide an option of working with a single flash memory, although in the preferred embodiment two flash memories are provided.

Where a single flash memory is provided in the boot socket (i.e. the first accessed flash memory), the boot strap compares the version numbers of the two sockets, reading $ffff as the number for the unpopulated socket. As a result, the checksum for the unpopulated socket fails so that the flash memory is executed.

Where a single flash is in the non-boot socket, the watchdog starts the hardware reset state machine because no code is executed, which then goes through the sequence described in the paragraph above.

When the correct boot-strap has been executed, an assembly level jump is made to the start of the main code. The jump point is defined in the same module as the FRU services described above. The jump is performed by modifying an exit function provided by the microcontroller compiler. This function normally resides in the CSTARTUP module of the compiler and is compiled into a library. A separate exit module is created which overwrites the exit module in a copy of the library. This approach reduces the impact of any compiler upgrades which require a change to CSTARTUP module. When the jump is made from the bootstrap, this releases all system resources, including memory, so that these are available for the main code. The boot-strap code is not re-entered until the next reset occurs.

A software down-load protocol employs a protocol stack which is designed to link to either a protocol stack used for the main radio link communications protocol or the overhead management channel (OMC) protocol stack used for operations and maintenance messaging. In other words, the communications protocol for software down-load is intended to make use of whatever existing messaging protocol is available between the central terminal and the subscriber terminal.

Figure 23:
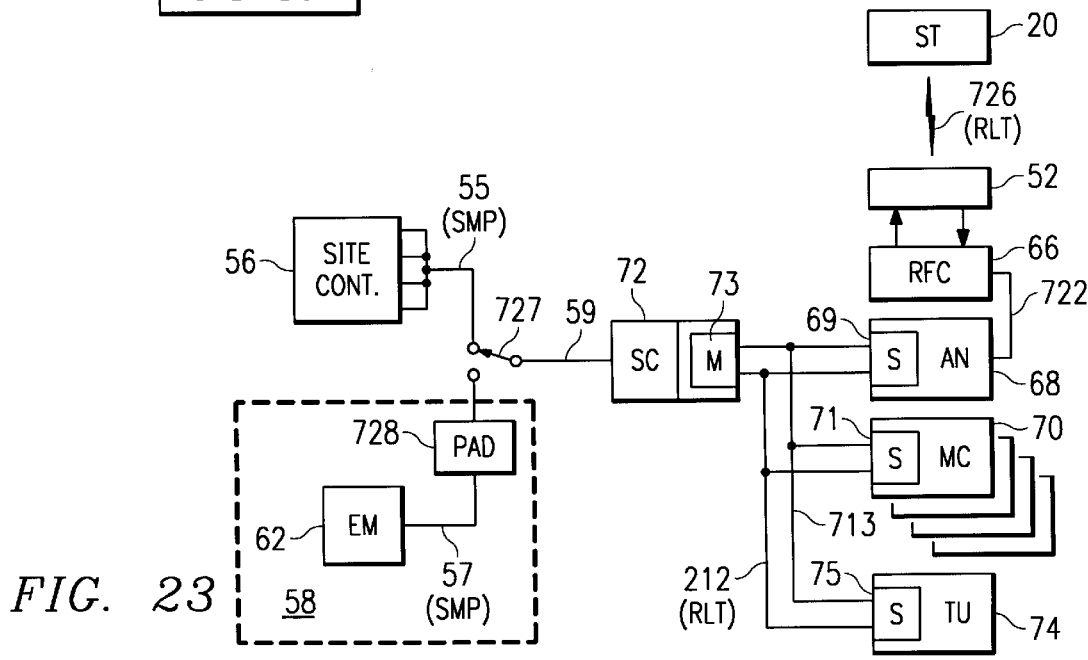
FIG. 23 is a schematic block diagram illustrating an example of various control protocols.

FIG. 23 is a schematic block diagram illustrating an example of various control protocols used for the transmission of control information between different parts of an example of a telecommunications system. It should be noted that FIG. 23 is directed to the control signal paths, and accordingly, the telephone call signal paths are not included. Many of the features of FIG. 23 have already been described above, and in this case the same reference numerals are used as before. Accordingly, these features will not be described again in detail.

A first protocol, called the Sub-system Management Processor (SMP) protocol, is used for communications between the shelf controller 72 and a site controller 56, or element manager 58, via lines 59 and 55, or 59 and 57, respectively. The first protocol is a balanced protocol with either party to a communication being able to initiate an exchange of information. The first protocol and the types of message which can be sent will be described in more detail below. As mentioned above, the shelf controller 72 is provided with an RS232 serial output for connection to a site controller 56. Accordingly, if a connection is provided instead to an element controller 62, represented schematically by the switch 727, a pad 728 for connection to an X.25 line, or the like, is used to convert between RS232 format and X.25 format.

A second protocol, called the Radio Link Termination (RLT) protocol, is used for passing control and data messages via the control 712 and data 713 buses on the modem shelf. In addition, it should be noted that the same protocol is valid on the radio link 726 between the antenna 52 of the central terminal and the subscriber terminal(s) 20.

The RLT protocol is an unbalanced protocol with the master communications interface 73 in the shelf controller 72 acting as a busmaster (M) and the slave communications interfaces 69, 71 and 75 on the analogue card, the modem cards and the tributary unit acting as slaves. In a preferred embodiment the master communications processing functions in the shelf controller are shared between a 68000 series microprocessor, which will hereafter be referred to as the master client, and a Hitachi H8 microcontroller, which will hereinafter be referred to as the master server. The slave communications processing functions in the tributary unit are similarly shared between a 68000 series microprocessor and a Hitachi H8 microcontroller. In the other slave units, including the communications controller of the subscriber terminal, the slave communications processing functions are performed in a Hitachi H8 microcontroller, which will hereinafter be referred to as the slave server.

Figure 24:
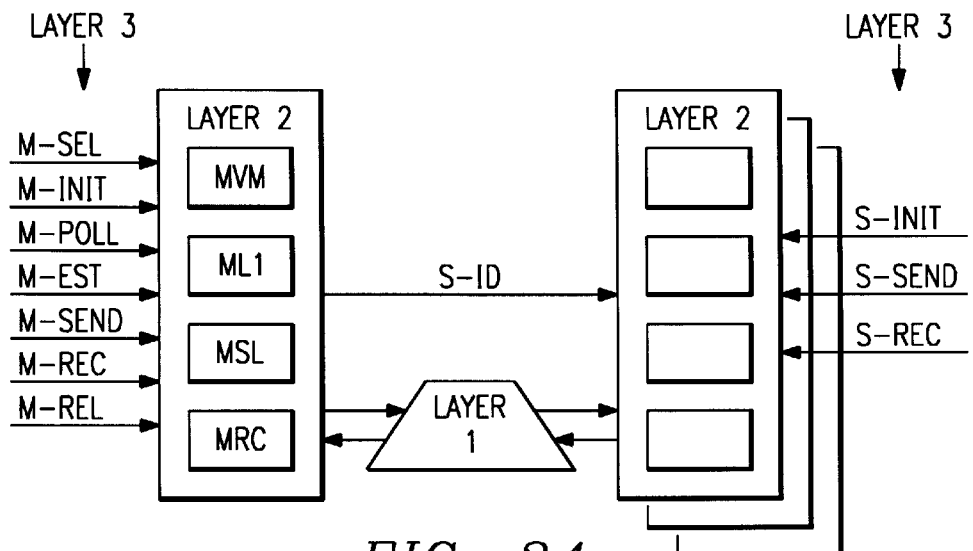
FIG. 24 is a schematic representation of a layered communication protocol.

The RLT communications protocol is based on three layers. FIG. 24 is a schematic representation of this layered protocol structure.

The master communications end point functions performed at the third layer include the following functions.

A master initialisation service process (M-INIT) sets up the master client part of the master communications end-point in the shelf controller. This service call must be executed before the other communications functions can be performed.

A master initialisation poll process (M-POLL) initialises the master server part of the master communications endpoint. This service process must be called before the following functions can be performed.

A master establish process (M-EST) establishes a connection over the bus from the master to a slave in response to a slave address referencing a slave board. Messages can be sent and received once a connection has been established.

A master send process (M-SEND) takes a message and sends it to a nominated slave over the bus as long as the connection to the slave has already been established.

A master receive process (M-REC) receives a message from a slave to be passed, for example, to a management processor.

A master release process (M-REL) releases a connection to a nominated slave preventing further send and receive functions from being performed.

A master select process (M-SEL) provides an addressing mechanism for the master to select one of the slaves with which to communicate.

The slave communications end-point functions performed at the third layer include the following functions.

A slave initialisation service process (S-INIT) initialises the slave communications end-point. This service function must be called before any of the other functions can be performed.

A slave send process (S-SEND) takes a message and sends it to the master, as long as the master has already established a connection to the slave.

A slave receive process (S-REC) function receives a message from the master to be passed, for example, to a network service element addressed by the message.

The master communications end-point M includes the following functional components.

A master VM (virtual machine) component (MVM) provides a set of services for the management of storage to dynamically allocate memory for buffers, queues, semaphores and timers.

A master layer 1 component (ML1) provides low level communication primitives for supporting byte transfer from the master server using a serial communication interface.

A master status list component (MSL) holds the status of each link from the master to one of the slaves. This is updated when a connection is made, broken or released.

A master retry count component (MRC) tracks the number of retires attempted in master to slave layer 2 communications. If this exceeds the limits for layer 2, the master breaks the connection with the slave.

The slave communications end-point M includes substantially the same functional components as the master.

The master layer 1 component (ML1) provides the following level 1 functions.

A master layer 1 initialisation process initialises the layer 1 communications system. No layer 1 communications can take place until this process has been invoked.

A master layer 1 byte-output process outputs a byte out of a serial communications port and waits for an acknowledgement from the receiver. If no acknowledgement is forthcoming, then a failure is registered.

A master layer 1 data-out process is similar to the byte output process except that more than one byte can be transferred.

A master layer 1 address-out process is similar to the byte output process except that the source byte is output with a bit set to indicate that this relates to a multiprocessor address rather than a data byte.

A master layer 1 data-in process waits for a specified number of bytes to be received on the communications port. If less than the required number of bytes is received, then a failure is registered.

The master VM component (MVM) provides the following functions:

A master VM initialisation process initialises the master VM component. This must be called before any other VM service.

A master VM get-message process removes a message from one of the queues held by the VM component.

A master VM put-message process places a message on one of the queues held by the VM component.

A master VM queue-full process indicates whether a selected queue is full.

A master VM get-buffer process allows a buffer to be requested from a buffer pool held by the VM component.

A master VM give-buffer process allows a buffer requested by the get-buffer process to be returned to the pool.

A master VM get-semaphore process allows a semaphore held by the VM component to be set.

A master VM give-semaphore process allows a semaphore set by the get-semaphore process to be cleared.

A master VM set-timer process sets a time-out period for one of the timers held by the master VM component. A flag is set by the master VM component when the timer expires.

A master VM add-timer function process registers an application function with the master VM component to be called at a particular time.

The master and the slaves both use VM components to provide buffers, queues, semaphores and timers in order to permit the transfer of messages.

Examples of operation of the RLT communications protocol are described in UK patent application 95108780.0, filed Jun. 2, 1995, the contents of which are incorporated herein by reference. It is on the RLT protocol that the software down-load protocol resides in the present embodiment of the invention. However, it should be noted that the details of the RLT protocol are not essential to the present invention, as any other protocol for the transmission of messages could be used to support the present software down-load protocol.

The software down-load protocol is a master slave arrangement, the master residing on the shelf controller (which forms a communication controller) at the central terminal and the slave residing on the modem card (which forms a communications controller) at the subscriber terminal. Each packet of the protocol can use multiple packets in the underlying protocol. Each message received is made up of component parts which are interpreted by the appropriate layer of the protocol. In a particular example, only consistently valid messages are passed down the stack to the lower layers. Similarly, each layer is responsible for constructing its own segment of the response/outgoing messages.

Each layer is responsible for management of its own sequence numbers, including out of sequence handling, retry mechanisms, and error reporting. All retry mechanisms and time-outs are driven by the protocol master (i.e. at the central terminal 10). Each layer only reports negative events to the layer above, thus reducing the internal communications overhead.

Figure 25:
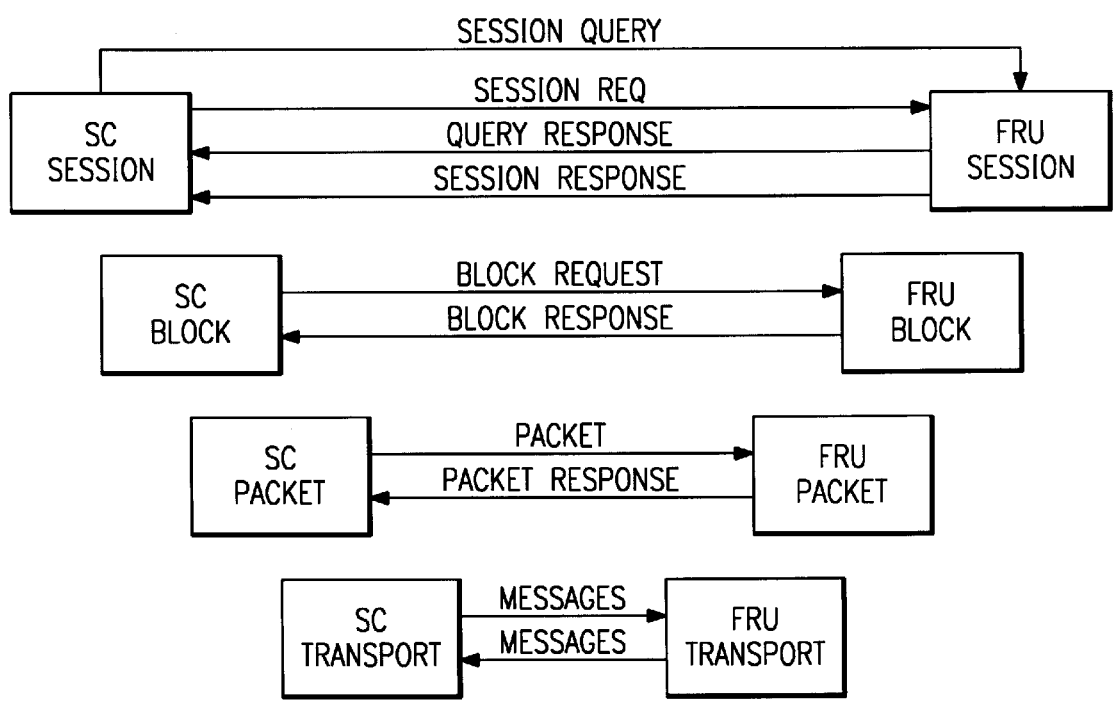
FIG. 25 is a schematic representation of the virtual flow of messages between master and slave layers.

FIG. 25 is a schematic representation of the virtual flow of messages between the corresponding master and slave layers, with "SC" representing the shelf controller, at the central terminal 10 and "FRU" representing a field replaceable unit, for example the communications controller at the subscriber terminal 20. It can be seen from the representation in FIG. 25 that each layer in the central terminal has its counterpart in the subscriber terminal. Each pair of layers operates in a master-slave mode, with the layers in the central terminal effectively acting as masters.

Figure 26:
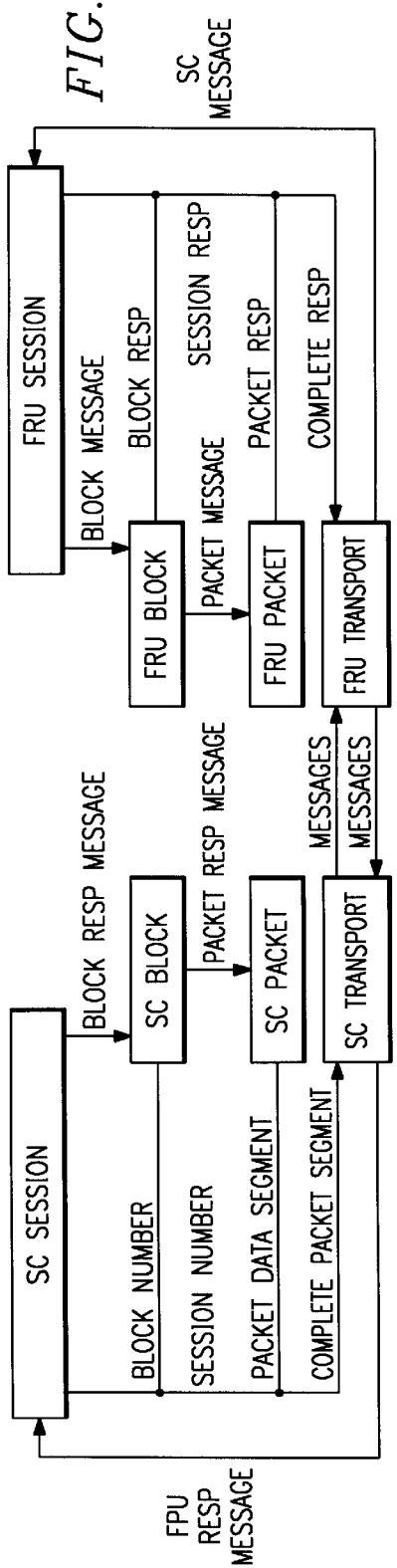
FIG. 26 is a schematic representation of message flow.

FIG. 26 is a schematic representation of the actual message flow contributed by the protocol layers when a message is constructed, or assembled, at the shelf controller (SC) in the central terminal and then disassembled at the communications controller (FRU) in the subscriber terminal. It can be seen from FIG. 26 that the received messages effectively move down the protocol from a top, session management level via a block management level to a packet management level. At each level checks are made on respective sequence numbers for each layer to verify that messages are not received out of sequence in a manner indicative of a fault, noting that some messages may be out of sequence without there being a fault.

The shelf controller at the central terminal handles download requests from the site management processor or site controller. These are converted into FRU session requests. The shelf controller implements the various layers of the protocol. A session management layer generates a unique session number which must be used for all subsequent communication during a session. The session layer is responsible for managing the session, ensuring the requisite number of blocks are transferred, querying the current session status when communications with the FRU are temporarily lost and terminating the session on completion.

Figure 27:
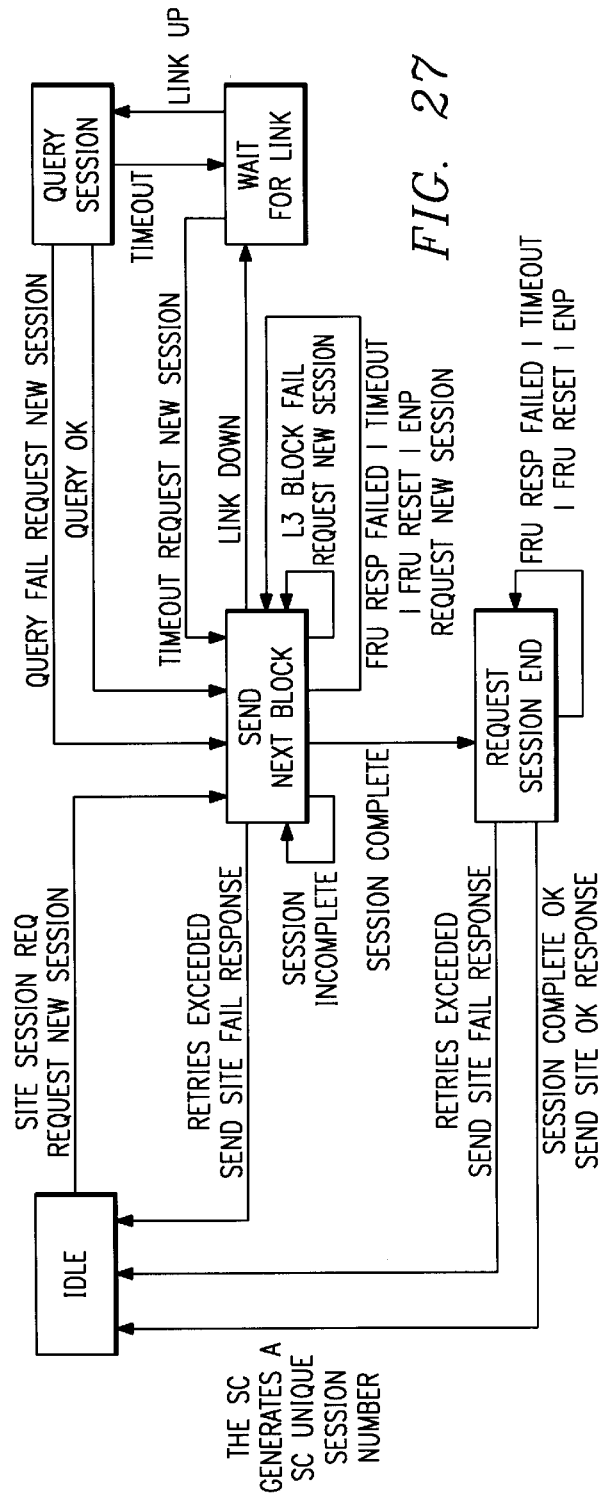
FIG. 27 illustrates a layer 4 state machine implemented at a central terminal.

FIG. 27 illustrates a layer 4 state machine implemented at the shelf controller. The various transitions indicated in the central terminal session state machine in FIG. 27 are, it is believed, self-explanatory and accordingly they will not be described in detail. However, it is to be noted that the transition from the idle state to the send_next_block state occurs in response to a new session request from the site controller or the site management processor. A new session number is set for the new session and this is used for all messages sent during the session. The effect of the send_next_block state is to start the central terminal block layer state machine illustrated in FIG. 29. On confirmation from the block layer state machine that the block has been transmitted successfully, the state machine either loops back to the send_next_block state if the session is incomplete and more blocks are to be sent, or moves to the request session end state. Other transitions which are effective in various error conditions are indicated in FIG. 27 including FRU_Response failed, which can occur, for example, when the session sequence number is in error, and various session request queries.

Figure 28:
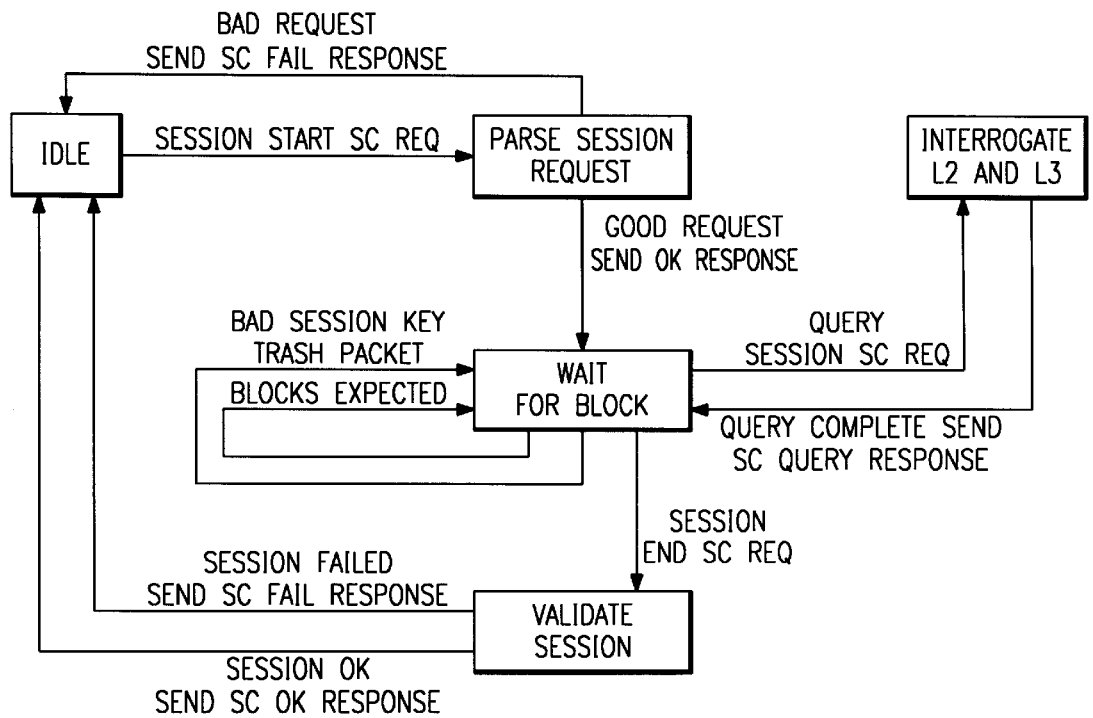
FIG. 28 illustrates a layer 4 state machine implemented at a subscriber terminal.

FIG. 28 illustrates a layer 4 state machine implemented at the FRU for handling the session and session query requests from the shelf controller, including various error transitions, which, it is believed, are clear from FIG. 28.

By monitoring the session number for received messages in layer 4, it is possible for multiple session to occur simultaneously.

Figure 29:
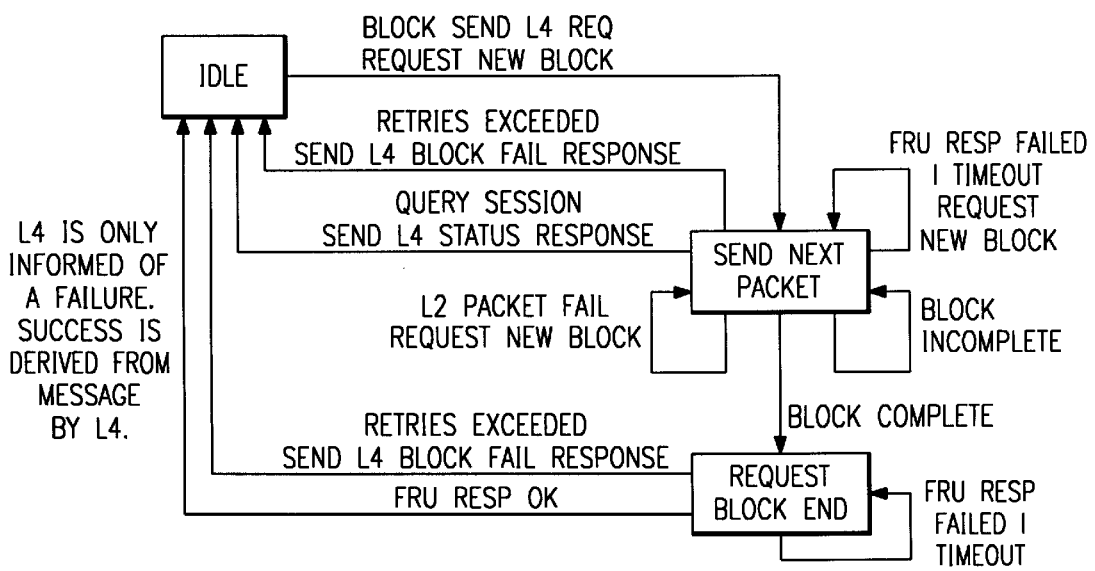
FIG. 29 illustrates a layer 3 state machine implemented at the central terminal.
Figure 30:
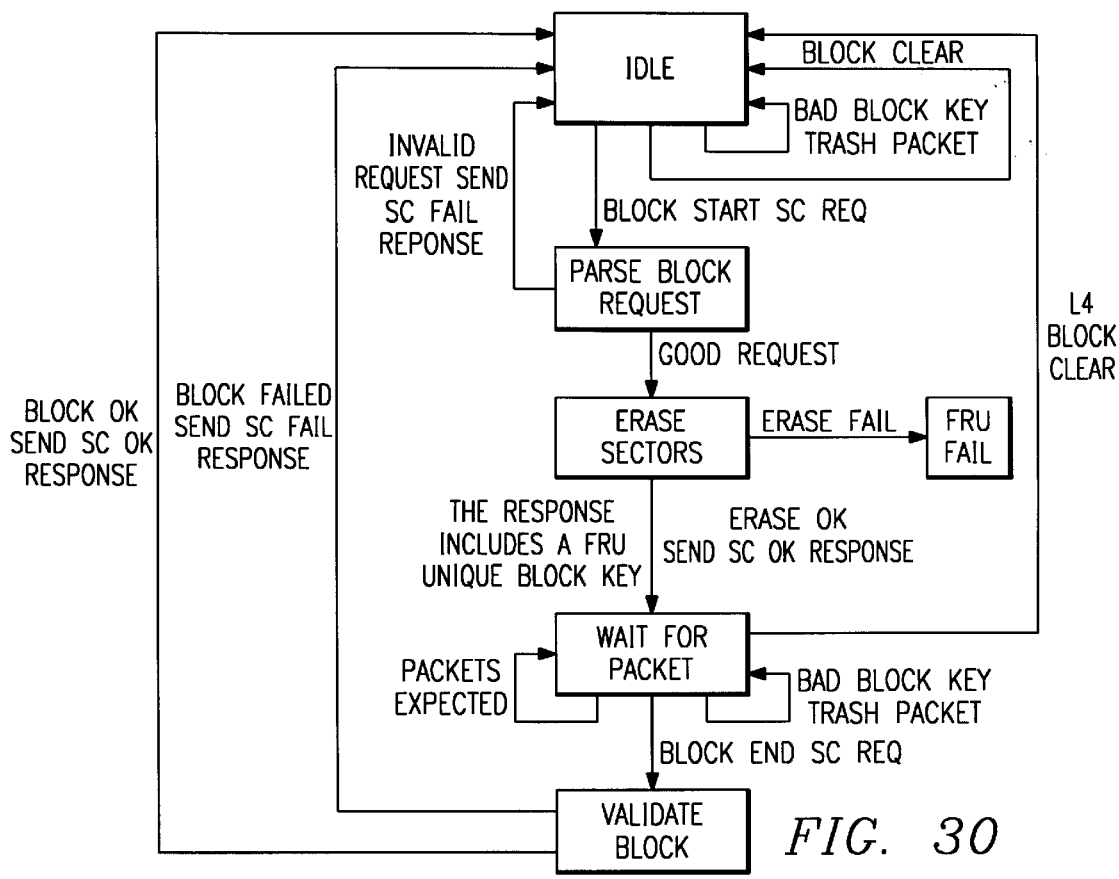
FIG. 30 illustrates a layer 3 state machine implemented at the subscriber terminal.

FIG. 29 illustrates a layer 3 state machine implemented at the shelf controller for initiating transfer of a block (each block consists of a number of packets) when requested by the session layer (L4), ensuring the requisite number of packets have been successfully transferred and terminating the block transfer when the block is complete. In response to a layer 4 block_send request, a request for a new block is sent from the central terminal block management layer 3 to the subscriber terminal. FIG. 30 illustrates a layer 3 state machine implemented at the FRU for managing the receipt of blocks and erasing the appropriate memory sector.

The subscriber terminal block management layer 3 generates a unique block sequence number in response to a block send request from the central terminal block management layer 3 which must be used by the central terminal block management layer 3 after the initial packet transfer. This prevents out of sequence stale packets being incorrectly interpreted and allows packets to be sent out of sequence without ambiguity at the subscriber terminal. After erasing appropriate sectors in memory, the subscriber terminal block management layer 3 sends a response to the central terminal layer 3, in response to which the central terminal layer 3 loops at the send_next_packet state until all packets for the block have been sent. FIG. 29 and 30 indicate various block management transitions including various error transitions, which, it is believed, are clear from FIG. 28.

Figure 31:
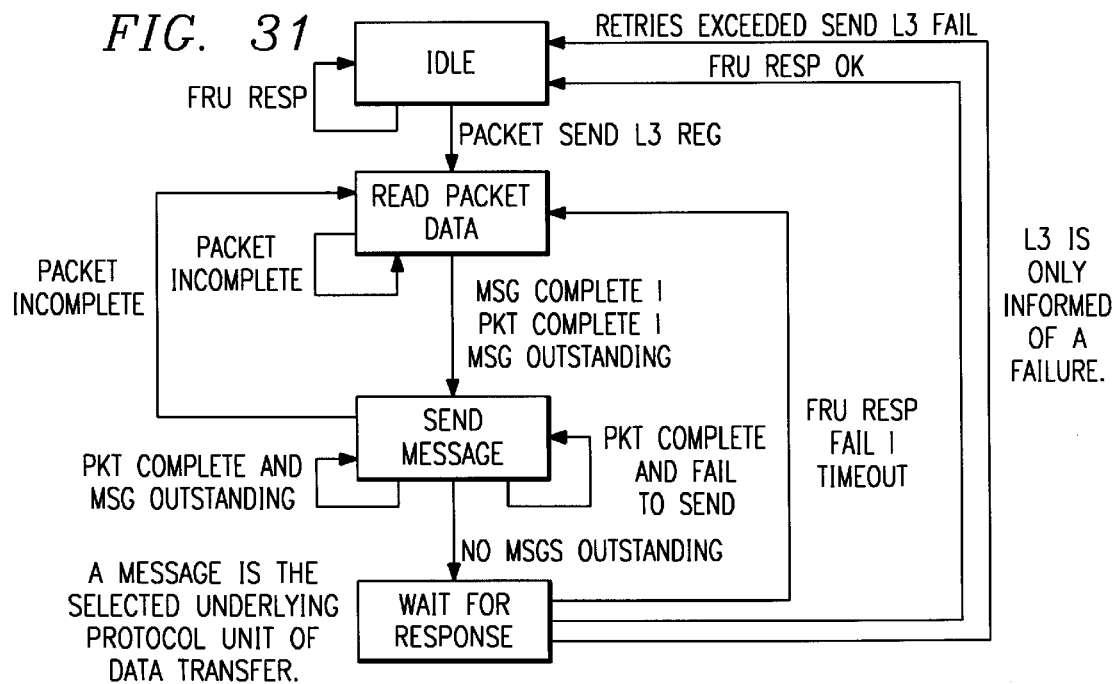
FIG. 31 illustrates a layer 2 state machine implemented at the central terminal.

FIG. 31 illustrates a layer 2 state machine implemented at the shelf controller and sitting on top of protocol which is used for the main radio link communications (e.g. the RLT protocol as described above). Alternatively, this could be arranged to sit on top of a protocol used for the operations and management channel (OMC). This layer 2 protocol forms the software down-load protocol master dealing with individual packets of data. A single packet may be made up multiple messages. An acknowledgement is expected for each packet. In response to a layer 3 send_packet event a packet number is issued by the central terminal packet management layer 2 and this is used for the messages relating to that packet, where one packet is split between messages. However, a single message can be used for sending a packet in some cases. The packet number is sequentially adjusted (e.g. incremented) for each packet to be sent, starting at the beginning of a block and then restarted for the next block. This enables packets to be sent out of sequence, if required.

FIG. 32 illustrates a layer 2 state machine implemented at the FRU and sitting on top of protocol which is used to support communications with the central terminal. This provides the slave end of the master-slave software download protocol dealing with individual packets of data, which may be composed of several protocol messages. Each packet is acknowledged when complete by means of a response message sent from the packet layer 2 via the message layer 1.

A message management layer 1 at the central terminal generates a message sequentially adjusted (e.g., incremented) number for each message for a packet where the packet is spread over more than one message. By a message is meant the underlying protocol unit of transfer As can be seen from the state machines illustrated in FIGS. 27–32, each layer is responsible for managing its own sequence (i.e. session, block, packet, etc.) number and reporting a failure at the master (i.e. the central terminal in the present case) if an error is detected.

FIG. 33 illustrates three types of messages, A, B and C used for transmitting dat from the master to the slave. Types A, B and C corresponds respectively to the commencement of the session, a block and a packet. Each type can carry data for all types which occur at lower levels in the protocol stack. The packet checksum can be replaced by a combined "more marker" and message sequence number allowing a packet to be split into several-messages. The number of bytes for a packet is then replaced by a message sequence number in a continuation packet. FIG. 34 represents a response message which is sent for each complete packet delivered (including packets of size 0 bytes) This shows an error if any layer of the protocol has failed.

In the manner described and using the protocol structure described above software is down-loaded from the central terminal, is stored in an appropriate one of the flash memories 310 and 312. The subscriber terminal can then execute this software.

Thus there has been described a protocol number scheme which allows communication to be periodically broken and re-established during a down-load session without re-starting the session. Multiple sessions can be managed by the master.

With the described protocol, code down-load does not detrimentally effect the performance of either the central terminal or the subscriber terminal. In particular, by passing the software via the control communications protocol, telephone calls may be made during software down-load.

The session, block and packet numbering scheme described herein allows out of sequence message transmission and response. It also allows reliable recovery when a subscriber terminal is being re-powered or replaced and subsequently receives out of date packets.

The use of the boot-strap enables identical code to be used for any number of field replaceable units. A set of external services (functions) can be registered with the boot-strap on initialisation, which services describe how to initialise the field replaceable unit, to read and write in the memory used and any further data required. On completion the boot-strap relinquishes all memory including any stacks before the main code is executed. This provides for maximum code re-use, new code for each field replaceable unit flash memory limited to hardware specific low level functions which can be defined in a single file.

Thus, a minimal device-independent boot-strap with device specific external service parameters provides a common operating environment can be provided for different pieces of equipment. This allows great flexibility for accommodating hardware and software changes and facilitates the down-loading of software upgrades to a range of devices. The boot-strap is preferably provided with a set of services describing how to initialise the hardware, read from the non-volatile memory (flash) and optionally load ancillary devices and perform keep-alive keep-alive functions. A write function can also be provided. The services are passed to the boot-strap when it is initialised. (These services are physically located in the flash boot-strap area).

The boot-strap provides a device independent state machine which controls the version checking, software integrity checking (checksum) and ancillary device configuration (loading), the latter being optional The boot-strap then terminates itself, relinquishing all resources and passing control to the main code. The boot strap can be considered as an object which knows what to do and when to do it, but does not possess all the details about how to interface with the hardware. The service registration provision provides this information.

The code down-load protocol layers (in the preferred embodiment configured as a master and slave) are device independent. The protocol stack, including the message transfer layer, can be placed on any field replaceable unit (FRU) and will thus provide all the state machines and message passing mechanisms required to support a code down-load session. The protocol stack(s) are provided with a set of hardware specific services describing how to initialise the hardware (for example including hardware timers), how to read and write a byte for hardware transmission, (optionally how to flush the memory) and also how to read and write to the non-volatile memory. Additional services describing how to erase non-volatile memory, and re-synchronise hardware and read hardware timers may also be provided. Thus, the concept can be compared to that for the boot-strap but this is a distinct and separate piece of code. The protocol slave will reside in the "main code" area with the hardware specific "main code" functionality.

Although a particular embodiment has been described herein, it will be appreciated that the invention is not limited thereto and that many modifications and additions thereto may be made within the scope of the invention.

For example, although in the embodiment described above, a FPGA circuit is used, in alternative embodiments, an ASIC could be used instead.

What is claimed is:

1. A subscriber station for the wireless connection of user telecommunications equipment to a remote central station of a wireless telecommunications system, said subscriber station comprising:
   a transmitter/receiver for wireless communication with said central station;
   at least one telephone line for connection to subscriber telecommunications equipment; and
   a communications controller connected between said transmitter/receiver and said telephone line for processing signals for transmission and/or received signals, said subscriber station being configurable in response to wireless programming signals representative of control code down-loaded from said central station, wherein said communications controller comprises:
      a plurality of memory portions for successive versions of said executable code, each memory portion containing a version of said executable code being associated with a version number for said executable code; and
      processing means responsive to said version numbers for executing executable code from the memory portion associated with the most recent valid version number, said communications controller being arranged to load a subsequent version of executable code down-loaded from said central station into a memory portion not containing the executable code being executed at that time in order to prevent interruption of subscriber station operation, a valid version number for said down-loaded executable code being associated with the memory portion concerned following successful down-load.

2. A subscriber station according to claim 1, wherein said communications controller comprises first and second memory portions for alternatively receiving successive executable code versions.

3. A subscriber station according to claim 2, wherein each said memory portion comprises flash memory.

4. A subscriber station according to claim 1, wherein said processing means comprises a reset state machine and a processor responsive to a reset state of said reset machine to determine which memory portion contains the executable code having the most recent valid version number.

5. A subscriber station according to claim 1, wherein said processor is a microcontroller.

6. A subscriber station according to claim 1, wherein said communications controller comprises a digital signal processor and/or a programmable storage unit, said processor configures said digital signal processor and/or said programmable storage unit with said executable code.

7. A subscriber station according to claim 1, wherein said transmitter/receiver comprises at least one aerial and is contained with said communications controller in a common housing to be mounted on a structure to permit wireless communication between said subscriber station and said remote central station.

8. A subscriber station according to claim 7, comprising a drop cable to a power supply unit and for connection of said user telecommunication equipment.

9. A method of programming a subscriber station for wireless connection of telecommunications equipment to a remote central station of a wireless telecommunications system, the method comprising:

determining which of a plurality of memory portions in a communications controller of said subscriber terminal contains an executable code version having a most recent valid version number;

executing, by means of a processor, said executable code having said most recent valid version number;

transmitting wireless programming signals representative of executable code down-loaded from said central station to said subscriber station, receiving said programming signals at said subscriber station; and storing said down-loaded executable code in a memory portion in said communications controller, the memory portion not containing executable code currently being executed in order to prevent interruption of subscriber station operation; and associating a valid version number with the memory portion receiving the down-loaded executable code following successful down-loading, the valid version number becoming said most recent valid version number executing said down-loaded executable code for configuring said subscriber station.

10. A method according to claim 9, wherein successive updates of executable code received from said central station are alternately stored in a respective one of two memory portions.

11. A method according to claim 10, wherein each said memory portion comprises flash memory.

12. A method according to claim 9, wherein said processor responds to a reset state of a state machine to determine which memory portion contains the control code having the most recent valid version number.

13. A method according to claim 9, wherein said processor is a microcontroller.

14. A method according to claim 9, wherein said processor configures a digital signal processor and/or a programmable storage unit in said subscriber station with said executable code.

* * * * *